US012656473B2

(12) United States Patent (10) Patent No.: US 12,656,473 B2
Sahara et al. (45) Date of Patent: Jun. 16, 2026

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Tooru Sahara, Yokohama (JP); Jun Kuroda, Kodaira (JP); Kenji Yamamoto, Yokohama (JP); Takuya Homma, Yokohama (JP); Fangwei Tong, Machida (JP)

(73) Assignee: KYOCERA Corporation, Kyoto (JP)

( * ) Notice: Subject to any disclaimer, the term of this patent is extended or adjusted under 35 U.S.C. 154(b) by 467 days.

(21) Appl. No.: 18/251,486

(22) PCT Filed: Nov. 11, 2021

(86) PCT No.: PCT/JP2021/041634
§ 371 (c)(1),
(2) Date: May 2, 2023

(87) PCT Pub. No.: WO2022/113767
PCT Pub. Date: Jun. 2, 2022

(65) Prior Publication Data
US 2024/0027597 A1      Jan. 25, 2024

(30) Foreign Application Priority Data

Nov. 27, 2020    (JP) ................................. 2020-197020

(51) Int. Cl.
*G01S 13/34*          (2006.01)
*G01S 7/03*           (2006.01)
(Continued)

(52) U.S. Cl.
CPC ............ *G01S 13/343* (2013.01); *G01S 7/032* (2013.01); *G01S 7/356* (2021.05); *G01S 13/584* (2013.01)

(58) Field of Classification Search
CPC .......... G01S 7/411; G01S 7/415; G01S 7/417; G01S 7/412; G01S 7/41; G01S 13/9027
(Continued)

(56) References Cited

U.S. PATENT DOCUMENTS 4,743,908 A * 5/1988 Brassfield ............. G01S 13/583
342/113
5,043,734 A * 8/1991 Niho ................... G01S 13/9019
342/197
(Continued)

FOREIGN PATENT DOCUMENTS

DE      10 2015 007 040 A1    12/2016
DE      10 2016 215 102 A1    12/2017
(Continued)

OTHER PUBLICATIONS

Yoichi Tomiki et al., "Examination of Target Classification for Millimeter-Wave Radar"; Japan Radio Company Review (JRC Review); Japan Radio Co., Ltd.; 2017; No. 68, ISSN 0287-1564; pp. 17-20.
(Continued)

*Primary Examiner* — Michael W Justice
(74) *Attorney, Agent, or Firm* — Studebaker Brackett PLLC

(57) ABSTRACT

An electronic device includes a transmission antenna, a reception antenna, and a controller. The transmission antenna transmits a transmission wave. The reception antenna receives a reflected wave that is the transmission wave having been reflected. The controller detects an object that reflects the transmission wave, based on a transmission signal transmitted as the transmission wave and a reception signal received as the reflected wave. The controller classifies a predetermined target, based on a probability density (Continued)

distribution calculated from a relative velocity of the object relative to the electronic device.

9 Claims, 15 Drawing Sheets

(51) Int. Cl.
  *G01S 7/35* (2006.01)
  *G01S 13/58* (2006.01)
(58) Field of Classification Search
  USPC .................................................. 342/128, 171
  See application file for complete search history.

(56) References Cited

U.S. PATENT DOCUMENTS

| | | | | |
|---|---|---|---|---|
| 6,563,451 B1 * | 5/2003 | Krikorian | ............... | G01S 13/89 |
| | | | | 342/25 R |
| 6,943,724 B1 * | 9/2005 | Brace | .................. | G01S 13/9029 |
| | | | | 342/25 R |
| 7,706,965 B2 * | 4/2010 | Downs | ................. | G08G 1/0104 |
| | | | | 701/117 |
| 7,831,380 B2 * | 11/2010 | Chapman | ............. | G08G 1/0104 |
| | | | | 701/119 |
| 7,899,611 B2 * | 3/2011 | Downs | ................. | G08G 1/0962 |
| | | | | 701/119 |
| 7,912,628 B2 * | 3/2011 | Chapman | ............. | G08G 1/0141 |
| | | | | 701/117 |
| 8,014,936 B2 * | 9/2011 | Chapman | ............. | G08G 1/0129 |
| | | | | 701/119 |
| 8,090,524 B2 * | 1/2012 | Chapman | .......... | G01C 21/3691 |
| | | | | 701/119 |
| 8,160,805 B2 * | 4/2012 | Downs | ................. | G08G 1/0112 |
| | | | | 701/117 |
| 8,483,940 B2 * | 7/2013 | Chapman | .......... | G01C 21/3691 |
| | | | | 701/119 |
| 8,648,743 B2 * | 2/2014 | Sierwald | ............... | G01S 13/951 |
| | | | | 342/195 |
| 8,682,571 B2 * | 3/2014 | Chapman | ............. | G08G 1/0141 |
| | | | | 701/119 |
| 8,830,125 B1 * | 9/2014 | Strassner, II | ......... | H01Q 21/065 |
| | | | | 343/700 MS |
| 8,880,324 B2 * | 11/2014 | Chapman | ............. | G08G 1/0104 |
| | | | | 701/119 |
| 8,909,463 B2 * | 12/2014 | Chapman | ............. | G08G 1/0129 |
| | | | | 701/119 |
| 9,280,894 B2 * | 3/2016 | Chapman | ............. | G08G 1/0112 |
| 10,109,060 B1 * | 10/2018 | Baylog | ..................... | G01S 7/41 |
| 10,929,653 B2 * | 2/2021 | Yan | ......................... | G06V 40/25 |
| 11,099,258 B2 * | 8/2021 | Buddendick | ............ | G01S 13/42 |
| 11,127,292 B2 * | 9/2021 | Bai | .................. | G08G 1/096725 |
| 11,131,766 B2 * | 9/2021 | Yan | ....................... | G01S 13/589 |
| 11,391,818 B2 * | 7/2022 | Buddendick | ............ | G01S 13/34 |
| 11,391,825 B2 * | 7/2022 | Braley | .................... | G01S 7/497 |
| 11,687,087 B2 * | 6/2023 | Choi | ..................... | G01S 17/931 |
| | | | | 701/28 |
| 11,878,712 B2 * | 1/2024 | Yu | ................... | B60W 60/00274 |
| 12,055,407 B2 * | 8/2024 | Yu | ....................... | G01C 21/3658 |
| 12,105,190 B2 * | 10/2024 | Mahieu | .............. | A01D 41/1271 |
| 2007/0208494 A1 * | 9/2007 | Chapman | ............. | G08G 1/0104 |
| | | | | 701/117 |
| 2007/0208495 A1 * | 9/2007 | Chapman | ............. | G08G 1/0133 |
| | | | | 701/117 |
| 2007/0208496 A1 * | 9/2007 | Downs | ................. | G08G 1/0133 |
| | | | | 701/117 |
| 2007/0208501 A1 * | 9/2007 | Downs | ...................... | B60T 7/18 |
| | | | | 701/79 |
| 2008/0046165 A1 * | 2/2008 | Downs | ................. | G08G 1/0104 |
| | | | | 701/117 |
| 2008/0071465 A1 * | 3/2008 | Chapman | ........... | G01C 21/3691 |
| | | | | 701/117 |
| 2011/0137545 A1 * | 6/2011 | Downs | ................. | G08G 1/0133 |
| | | | | 701/119 |
| 2011/0173015 A1 * | 7/2011 | Chapman | ............. | G08G 1/0116 |
| | | | | 701/119 |
| 2011/0288756 A1 * | 11/2011 | Chapman | ............. | G08G 1/0104 |
| | | | | 701/119 |
| 2012/0150425 A1 * | 6/2012 | Chapman | ............. | G08G 1/0129 |
| | | | | 701/119 |
| 2013/0289862 A1 * | 10/2013 | Chapman | .................. | G08G 1/00 |
| | | | | 701/119 |
| 2014/0062793 A1 * | 3/2014 | AlSindi | .................. | G01S 5/0218 |
| | | | | 342/450 |
| 2014/0149028 A1 * | 5/2014 | Chapman | ............. | G08G 1/0116 |
| | | | | 701/119 |
| 2014/0149030 A1 * | 5/2014 | Chapman | .................. | G08G 1/00 |
| | | | | 701/119 |
| 2015/0094941 A1 * | 4/2015 | Chapman | ............. | G08G 1/0133 |
| | | | | 701/119 |
| 2017/0109653 A1 * | 4/2017 | Agarwal | ............... | G06F 16/285 |
| 2019/0137606 A1 * | 5/2019 | Buddendick | .......... | G01S 13/536 |
| 2019/0310362 A1 * | 10/2019 | Yan | ......................... | G01S 7/415 |
| 2019/0318162 A1 * | 10/2019 | Yan | ....................... | G01S 13/931 |
| 2020/0124706 A1 * | 4/2020 | Buddendick | .......... | G01S 13/343 |
| 2020/0234585 A1 * | 7/2020 | Bai | .................. | G08G 1/096725 |
| 2021/0003682 A1 * | 1/2021 | Braley | ...................... | G06N 3/08 |
| 2021/0127573 A1 * | 5/2021 | Mahieu | .............. | A01D 41/1243 |
| 2021/0262819 A1 * | 8/2021 | Yu | ....................... | G01C 21/3602 |
| 2021/0286371 A1 * | 9/2021 | Choi | .................. | G05D 1/0219 |
| 2022/0153296 A1 * | 5/2022 | Yu | ...................... | B60W 60/0011 |

FOREIGN PATENT DOCUMENTS

| | | |
|---|---|---|
| EP | 1843308 A1 | 10/2007 |
| JP | 2008-134750 A | 6/2008 |
| JP | 2015-190777 A | 11/2015 |

OTHER PUBLICATIONS

Hideo Shibayama; "Diagnosis of Adhesive Bonding Condition of Tiles on a Concrete Wall"; Reports of the Meeting of the Acoustical Society of Japan; Sep. 17, 2003; ISSN 1340-3168; pp. 759-760.

* cited by examiner

Figure 3:
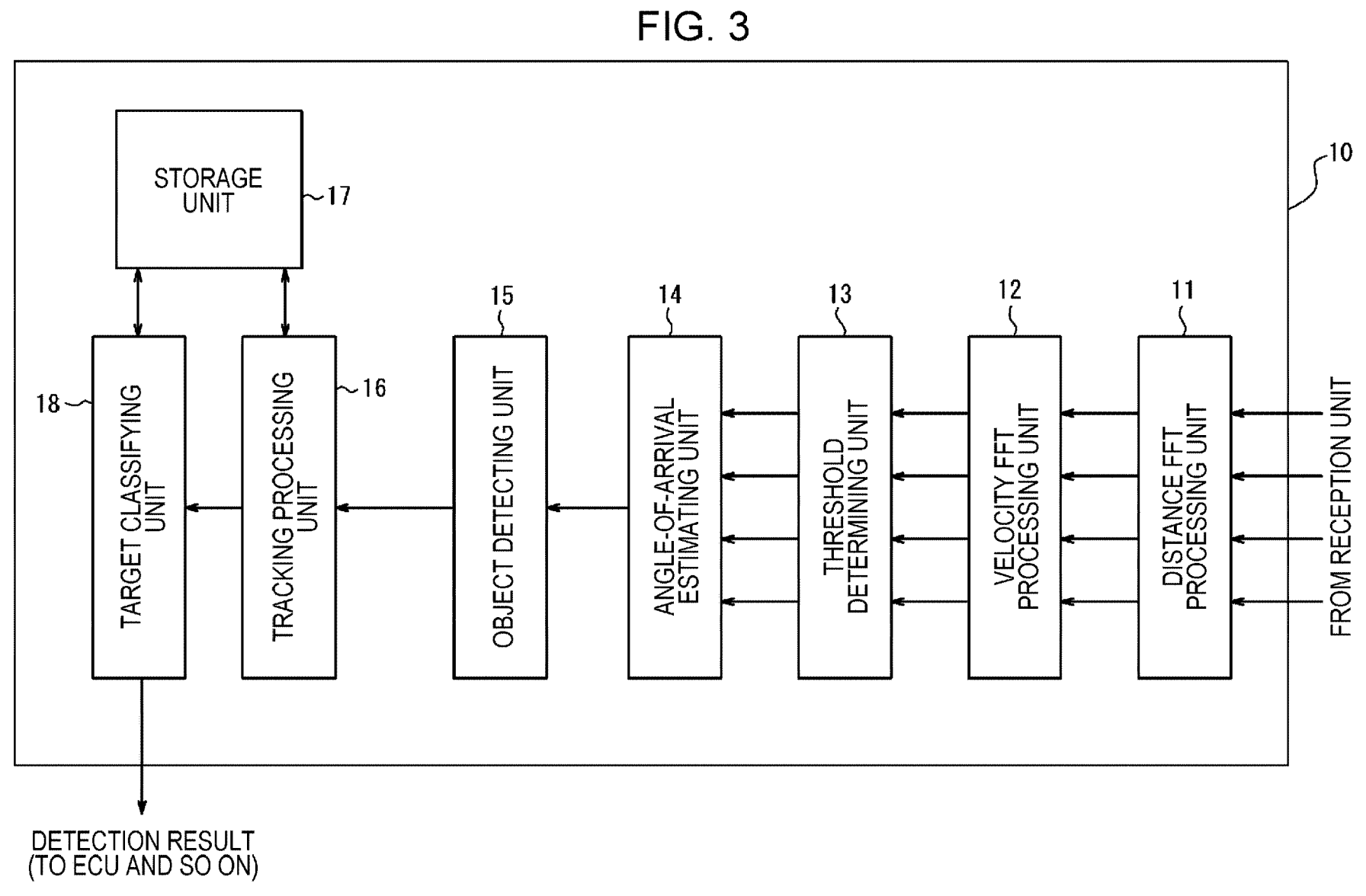

FROM RECEPTION UNIT

11 DISTANCE FFT PROCESSING UNIT

12 VELOCITY FFT PROCESSING UNIT

13 THRESHOLD DETERMINING UNIT

14 ANGLE-OF-ARRIVAL ESTIMATING UNIT

15 OBJECT DETECTING UNIT

16 TRACKING PROCESSING UNIT

17 STORAGE UNIT

18 TARGET CLASSIFYING UNIT

DETECTION RESULT (TO ECU AND SO ON)

FIG. 11

| OBJECT CLASS | SUBCLASS | KL DIVERGENCE |
|:---:|:---:|:---:|
| 1 | 1 | 0. 1 |
| 1 | 2 | 0. 02 |
| 2 | 2 | 0. 3 |
| 3 | 2 | 0. 03 |
| $\vdots$ | $\vdots$ | $\vdots$ |
| $k_1$ | $i_1$ | $D_{KL}[k_2, i_1, j]$ |
| $\vdots$ | $\vdots$ | $\vdots$ |
| $k_2$ | $i_2$ | $D_{KL}[k_2, i_2, j]$ |

ELECTRONIC DEVICE, METHOD FOR CONTROLLING ELECTRONIC DEVICE, AND PROGRAM

CROSS-REFERENCE TO RELATED APPLICATIONS

This application claims priority from Japanese Patent Application No. 2020-197020 filed in Japan on Nov. 27, 2020, the entire disclosure of which is incorporated herein by reference.

TECHNICAL FIELD

The present disclosure relates to an electronic device, a method for controlling an electronic device, and a program.

BACKGROUND OF INVENTION

For example, in fields such as automobile-related industries, a technology for measuring a distance or the like between a vehicle of interest and a predetermined object is regarded as important. Recently, various studies have been conducted particularly on a radar (Radio Detecting and Ranging) technology for measuring a distance or the like to an object such as an obstacle by transmitting a radio wave such as a millimeter wave and then receiving a reflected wave reflected off the object. Such a technology for measuring a distance or the like expectedly becomes more important in the future with progresses of a technology for assisting drivers in driving and an automated-driving-related technology for partially or entirely automating driving.

Some suggestions have been made on a technology for detecting the presence of a predetermined object and classifying the object by receiving a reflected wave of a radio wave that has been transmitted and reflected off the object. For example, Patent Literature 1 discloses a pedestrian detection apparatus that irradiates an observation target in front of the apparatus with an electromagnetic wave, and determines whether the observation target is a pedestrian based on a reflected wave of the electromagnetic wave. Non Patent Literature 1 discusses target classification for classifying pedestrians, bicycles, and automobiles by accumulating information acquired with a radar and performing machine learning of the information.

CITATION LIST

Patent Literature

Patent Literature 1: Japanese Unexamined Patent Application Publication No. 2015-190777

Non Patent Literature

Non Patent Literature 1: Yoichi Tomiki and three others, "Examination of Target Classification for Millimeter-Wave Radar", Japan Radio Company Review (JRC REVIEW), Japan Radio Co., Ltd., 2017, No. 68, ISSN 0287-1564, p. 17

SUMMARY

In one embodiment, an electronic device includes a transmission antenna, a reception antenna, and a controller.

The transmission antenna transmits a transmission wave.

The reception antenna receives a reflected wave that is the transmission wave having been reflected.

The controller detects an object that reflects the transmission wave, based on a transmission signal transmitted as the transmission wave and a reception signal received as the reflected wave.

The controller classifies a predetermined target, based on a probability density distribution calculated from a relative velocity of the object relative to the electronic device.

In one embodiment, a method for controlling an electronic device includes transmitting a transmission wave from a transmission antenna, receiving, from a reception antenna, a reflected wave that is the transmission wave having been reflected, and detecting an object that reflects the transmission wave, based on a transmission signal transmitted as the transmission wave and a reception signal received as the reflected wave, and classifying a predetermined target, based on a probability density distribution calculated from a relative velocity of the object relative to the electronic device.

In one embodiment, a program causes an electronic device to transmit a transmission wave from a transmission antenna, receive, from a reception antenna, a reflected wave that is the transmission wave having been reflected, detect an object that reflects the transmission wave, based on a transmission signal transmitted as the transmission wave and a reception signal received as the reflected wave, and classify a predetermined target, based on a probability density distribution calculated from a relative velocity of the object relative to the electronic device.

BRIEF DESCRIPTION OF THE DRAWINGS

FIG. 3 is a functional block diagram schematically illustrating a controller of the electronic device according to the one embodiment.

FIG. 11 is a diagram illustrating an example of a list of object classes for a j-th target.

DESCRIPTION OF EMBODIMENTS

Figure 1:
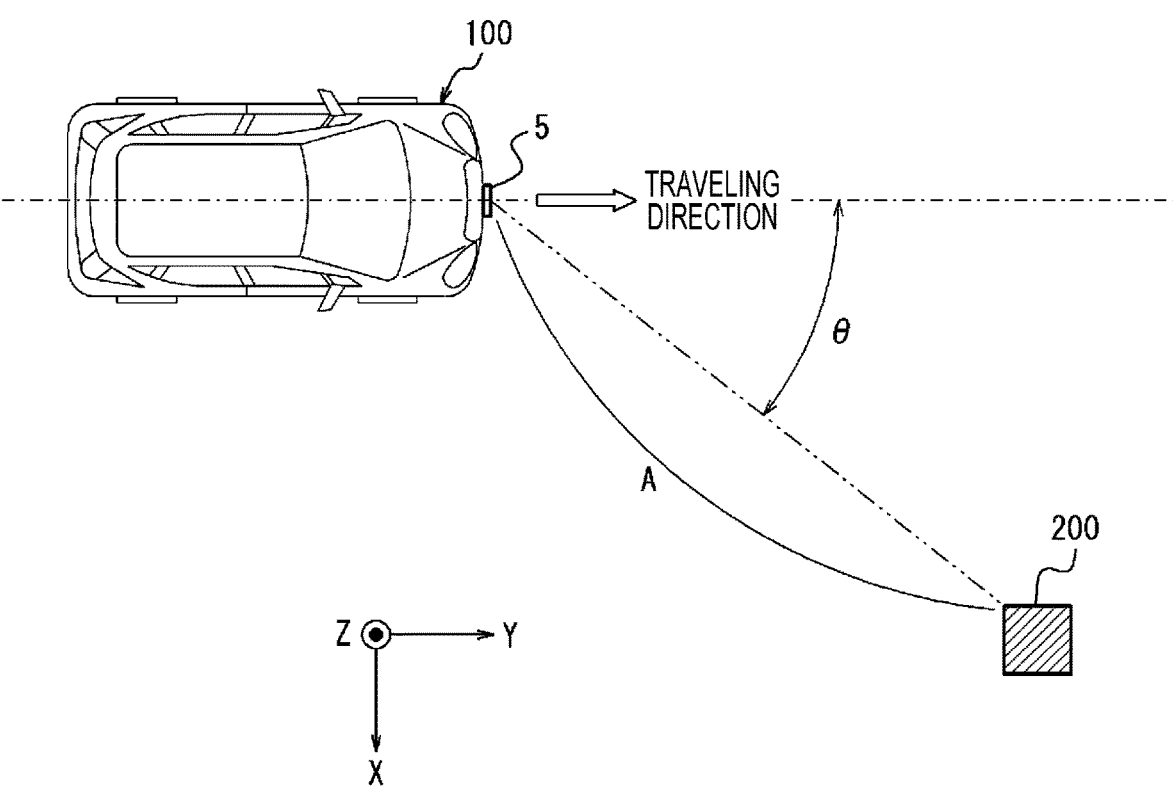
FIG. 1 is a diagram for describing how an electronic device according to one embodiment is used.

The processing load of classifying a target is desirably reduced in a technology for detecting a predetermined object by receiving a reflected wave that is a transmitted transmission wave reflected off the object. The present disclosure provides an electronic device, a method for controlling an electronic device, and a program that can reduce the processing load of classifying a target. According to one embodiment, an electronic device, a method for controlling an electronic device, and a program that can reduce the processing load of classifying a target can be provided. The one embodiment is described in detail below with reference to the drawings.

An electronic device according to one embodiment is mounted in a vehicle (mobility device) such as an automobile, for example, and is capable of detecting, as a target, a predetermined object located around the mobility device. To this end, the electronic device according to the one embodiment is capable of transmitting a transmission wave to an area around the mobility device from a transmission antenna installed on or in the mobility device. The electronic device according to the one embodiment is also capable of receiving a reflected wave that is the reflected transmission wave, from a reception antenna installed on or in the mobility device. For example, a radar sensor or the like installed on or in the mobility device may include at least one of the transmission antenna or the reception antenna.

A typical configuration example is described below in which the electronic device according to the one embodiment is mounted in an automobile such as a passenger car. However, the mobility device in which the electronic device according to the one embodiment is mounted is not limited to an automobile. The electronic device according to the one embodiment may be mounted in various mobility devices such as an autonomous car, a bus, a truck, a taxi, a motorcycle, a bicycle, a ship, an aircraft, a helicopter, agricultural machinery such as a tractor, a snowplow, a garbage truck, a police car, an ambulance, and a drone. The mobility device in which the electronic device according to the one embodiment is mounted is not necessarily limited to a mobility device that moves by its own motive power. For example, the mobility device in which the electronic device according to the one embodiment is mounted may be a trailer towed by a tractor. The electronic device according to the one embodiment is capable of measuring a distance or the like between a sensor and a predetermined object when at least one of the sensor or the object is movable. The electronic device according to the one embodiment is also capable of measuring a distance or the like between the sensor and the object even when both the sensor and the object are stationary. In addition, the automobile encompassed by the present disclosure is not limited by the overall length, the overall width, the overall height, the displacement, the seating capacity, the load, or the like. For example, the automobiles of the present disclosure include an automobile having a displacement greater than 660 cc and an automobile having a displacement equal to or less than 660 cc that is a so-called light automobile. The automobiles encompassed by the present disclosure also include an automobile that partially or entirely uses electricity as energy and uses a motor.

An example of how the electronic device according to the one embodiment detects an object is described.

FIG. 1 is a diagram for describing how the electronic device according to the one embodiment is used. FIG. 1 illustrates an example in which a sensor, including a transmission antenna and a reception antenna, according to the one embodiment is installed on a mobility device.

A mobility device 100 illustrated in FIG. 1 includes a sensor 5 installed thereon. The sensor 5 according to the one embodiment includes a transmission antenna and a reception antenna. The mobility device 100 illustrated in FIG. 1 includes an electronic device 1 according to the one embodiment mounted (for example, built) therein. A specific configuration of the electronic device 1 is described later. The sensor 5 may include at least one of the transmission antenna or the reception antenna, for example. The sensor 5 may appropriately include at least any of other functional units, such as at least part of a controller 10 (FIG. 2) included in the electronic device 1. The mobility device 100 illustrated in FIG. 1 may be an automotive vehicle such as a passenger car but may be a mobility device of any type. In FIG. 1, the mobility device 100 may move (travel or slowly travel), for example, in a positive Y-axis direction (traveling direction) illustrated in FIG. 1 or in another direction, or may be stationary without moving.

As illustrated in FIG. 1, the sensor 5 including the transmission antenna is installed on the mobility device 100. In the example illustrated in FIG. 1, only one sensor 5 including the transmission antenna and the reception antenna is installed at a front portion of the mobility device 100. The position where the sensor 5 is installed on the mobility device 100 is not limited to the position illustrated in FIG. 1 and may be another appropriate position. For example, the sensor 5 illustrated in FIG. 1 may be installed on a left side, on a right side, and/or at a rear portion of the mobility device 100. The number of such sensors 5 may be any number equal to or greater than 1 depending on various conditions (or requirements) such as a range and/or an accuracy of measurement performed at the mobility device 100. The sensor 5 may be installed inside the mobility device 100. The inside the mobility device 100 may be, for example, a space inside a bumper, a space inside a body, a space inside a headlight, or a space such as a driver's space.

The sensor 5 transmits an electromagnetic wave as a transmission wave from the transmission antenna. For example, when a predetermined object (for example, an object 200 illustrated in FIG. 1) is located around the mobility device 100, at least part of the transmission wave transmitted from the sensor 5 is reflected off the object to become a reflected wave. For example, the reception antenna of the sensor 5 receives such a reflected wave. In this manner, the electronic device 1 mounted in the mobility device 100 can detect the object as a target.

The sensor 5 including the transmission antenna may be typically a radar (Radio Detecting and Ranging) sensor that transmits and receives a radio wave. However, the sensor 5 is not limited to a radar sensor. The sensor 5 according to the one embodiment may be, for example, a sensor based on the LIDAR (Light Detection and Ranging, Laser Imaging Detection and Ranging) technology that uses an optical wave. Each of these sensors can include, for example, a patch antenna. Since the technologies such as the radar and the LIDAR are already known, detailed description may be appropriately simplified or omitted.

The electronic device 1 mounted in the mobility device 100 illustrated in FIG. 1 receives, from the reception antenna, the reflected wave of the transmission wave transmitted from the transmission antenna of the sensor 5. In this manner, the electronic device 1 can detect, as the target, the predetermined object 200 located within a predetermined distance from the mobility device 100. For example, as illustrated in FIG. 1, the electronic device 1 can measure a distance A between the mobility device 100, which is a vehicle of interest, and the predetermined object 200. The electronic device 1 can also measure a relative velocity between the mobility device 100, which is the vehicle of interest, and the predetermined object 200. The electronic device 1 can further measure a direction (an angle of arrival θ) from which the reflected wave from the predetermined object 200 arrives at the mobility device 100, which is the vehicle of interest.

The object 200 may be, for example, at least any of an oncoming automobile traveling in a lane adjacent to a lane of the mobility device 100, an automobile traveling next to the mobility device 100, an automobile traveling in front of or behind the mobility device 100 in the same lane, or the like. The object 200 may also be any object located around the mobility device 100, such as a motorcycle, a bicycle, a stroller, a person such as a pedestrian, an animal, other forms of life such as an insect, a guardrail, a median strip, a road sign, a step on a sidewalk, a wall, a maintenance hole, or an obstacle. The object 200 may be in motion or stationary. For example, the object 200 may be an automobile or the like that is parked or stationary around the mobility device 100. In the present disclosure, the object detected by the sensor 5 includes a living thing such as a person or an animal in addition to a non-living thing. The object detected by the sensor 5 in the present disclosure includes a target, which includes a person, an object, and an animal, to be detected with the radar technology.

In FIG. 1, a ratio between a size of the sensor 5 and a size of the mobility device 100 does not necessarily indicate an actual ratio. FIG. 1 illustrates the sensor 5 that is installed at an outer portion of the mobility device 100. However, in one embodiment, the sensor 5 may be installed at various positions of the mobility device 100. For example, in one embodiment, the sensor 5 may be installed inside a bumper of the mobility device 100 so as not to be seen in the appearance of the mobility device 100.

Description is given below on the assumption that the transmission antenna of the sensor 5 transmits a radio wave in a frequency band, such as a millimeter wave (equal to or higher than 30 GHz) or a quasi-millimeter wave (for example, around 20 GHz to 30 GHz) as a typical example. For example, the transmission antenna of the sensor 5 may transmit a radio wave having a frequency bandwidth of 4 GHz such as from 77 GHz to 81 GHz.

Figure 2:
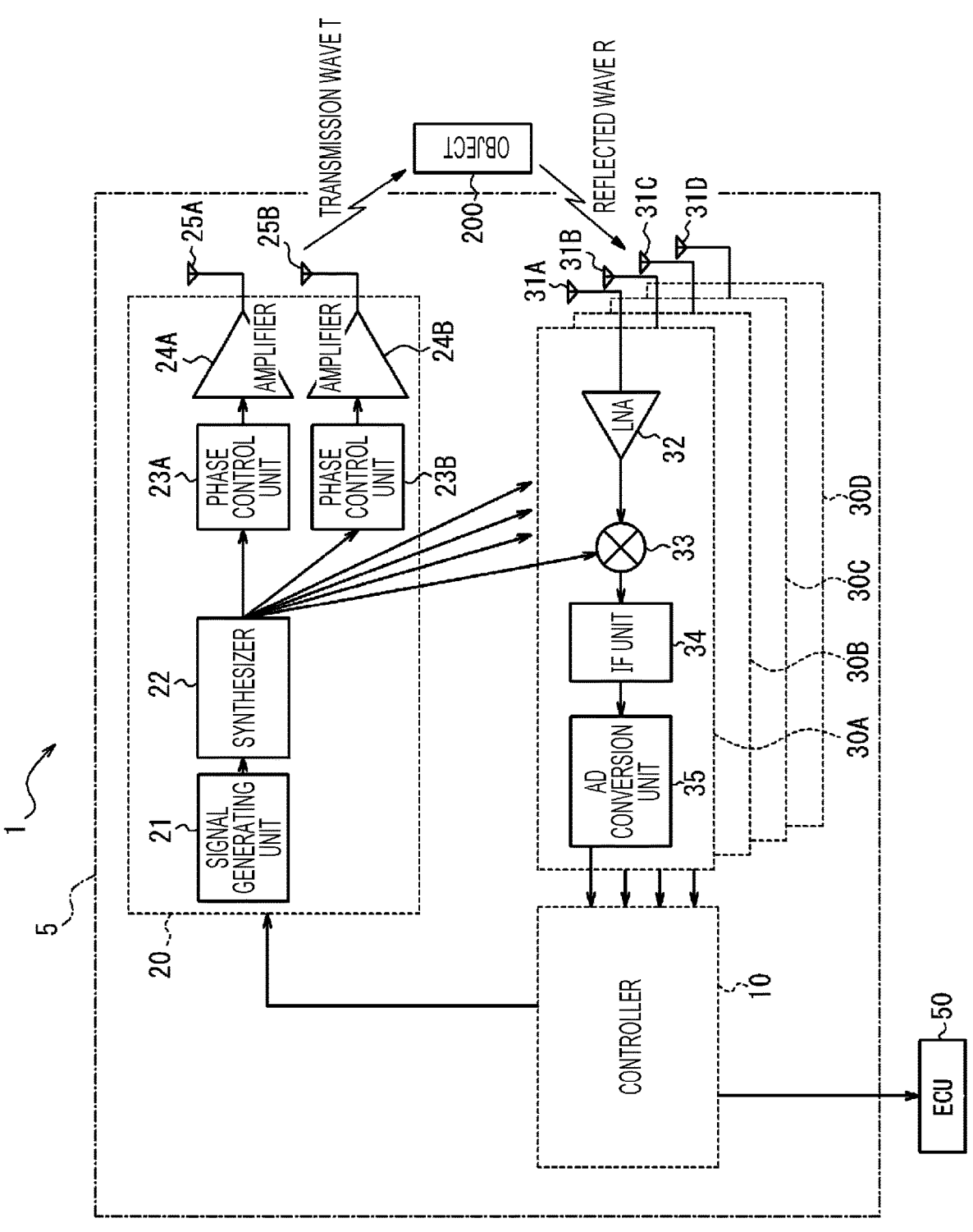
FIG. 2 is a functional block diagram schematically illustrating a configuration of the electronic device according to the one embodiment.

FIG. 2 is a functional block diagram schematically illustrating an example of a configuration of the electronic device 1 according to the one embodiment. An example of the configuration of the electronic device 1 according to the one embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHz, for example, has a frequency bandwidth of 4 GHz such as from 77 GHz to 81 GHz, for example. The radar of the frequency band of 79 GHz has a feature that a usable frequency bandwidth is wider than other millimeter-wave and/or quasi-millimeter-wave radars of frequency bands of 24 GHz, 60 GHz, and 76 GHz, for example. Such an embodiment is described below as an example.

As illustrated in FIG. 2, the electronic device 1 according to the one embodiment includes the sensor 5 and an ECU (Electronic Control Unit) 50. The ECU 50 controls various operations of the mobility device 100. The ECU 50 may include at least one or more ECUs. The electronic device 1 according to the one embodiment includes the controller 10. The electronic device 1 according to the one embodiment may also appropriately include another functional unit such as at least any of a transmission unit 20 or reception units 30A to 30D. As illustrated in FIG. 2, the electronic device 1 may include multiple reception units such as the reception units 30A to 30D. When the reception units 30A, 30B, 30C, and 30D are not distinguished from one another, the reception units 30A, 30B, 30C, and 30D are simply referred to as "reception units 30" below.

As illustrated in FIG. 3, the controller 10 may include a distance FFT processing unit 11, a velocity FFT processing unit 12, a threshold determining unit 13, an angle-of-arrival estimating unit 14, an object detecting unit 15, a tracking processing unit 16, a storage unit 17, and a target classifying unit 18. These functional units included in the controller 10 are further described later.

As illustrated in FIG. 2, the transmission unit 20 may include a signal generating unit 21, a synthesizer 22, phase control units 23A and 23B, amplifiers 24A and 24B, and transmission antennas 25A and 25B. When the phase control units 23A and 23B are not distinguished from each other, the phase control units 23A and 23B are simply referred to as "phase control units 23" below. When the amplifiers 24A and 24B are not distinguished from each other, the amplifiers 24A and 24B are simply referred to as "amplifiers 24" below. When the transmission antennas 25A and 25B are not distinguished from each other, the transmission antennas 25A and 25B are simply referred to as "transmission antennas 25" below.

As illustrated in FIG. 2, each of the reception units 30 may include a respective one of reception antennas 31A to 31D. When the reception antennas 31A, 31B, 31C, and 31D are not distinguished from one another, the reception antennas 31A, 31B, 31C, and 31D are simply referred to as "reception antennas 31" below. As illustrated in FIG. 2, each of the multiple reception units 30 may include an LNA 32, a mixer 33, an IF unit 34, and an AD conversion unit 35. The reception units 30A to 30D may have the same and/or similar configuration. FIG. 2 schematically illustrates the configuration of only the reception unit 30A as a representative example.

The sensor 5 described above may include, for example, the transmission antennas 25 and the reception antennas 31. The sensor 5 may also appropriately include at least any of other functional units such as the controller 10.

The controller 10 included in the electronic device 1 according to the one embodiment is capable of controlling the individual functional units of the electronic device 1 and controlling operations of the entire electronic device 1. To provide control and processing capabilities for executing various functions, the controller 10 may include at least one processor, for example, a CPU (Central Processing Unit) or a DSP (Digital Signal Processor). The controller 10 may be collectively implemented by one processor, may be implemented by some processors, or may be implemented by discrete individual processors. The processor may be implemented as one integrated circuit. The integrated circuit is also referred to as an IC. The processor may be implemented as multiple integrated circuits and discrete circuits connected to be able to perform communication. The processor may be implemented based on various other known technologies. In the one embodiment, the controller 10 may be configured as, for example, a CPU (hardware) and a program (software) executed by the CPU. The controller 10 may appropriately include a memory necessary for operations of the controller 10.

In the electronic device 1 according to the one embodiment, the controller 10 is capable of controlling at least one of the transmission unit 20 or the reception units 30. In this case, the controller 10 may control at least one of the transmission unit 20 or the reception units 30, based on various kinds of information stored in the any storage unit (memory). In the electronic device 1 according to the one embodiment, the controller 10 may instruct the signal generating unit 21 to generate a signal or may control the signal generating unit 21 to generate a signal.

In accordance with control performed by the controller 10, the signal generating unit 21 generates a signal (transmission signal) to be transmitted as a transmission wave T from each of the transmission antennas 25. When generating a transmission signal, the signal generating unit 21 may allocate a frequency of the transmission signal in accordance with control performed by the controller 10, for example. Specifically, the signal generating unit 21 may allocate the frequency of the transmission signal in accordance with a parameter set by the controller 10, for example. For example, the signal generating unit 21 receives frequency information from the controller 10 or the any storage unit (memory) and generates a signal having a predetermined frequency in a frequency band such as from 77 GHz to 81 GHz, for example. The signal generating unit 21 may include a functional unit such as a voltage control oscillator (VCO), for example.

The signal generating unit 21 may be configured as hardware having the function, for example as a microcomputer, or for example as a processor such as a CPU and a program or the like executed by the processor. Each functional unit described below may also be configured as hardware having the function, for example as a microcomputer if possible, or for example as a processor such as a CPU and a program or the like executed by the processor if possible.

In the electronic device 1 according to the one embodiment, the signal generating unit 21 may generate a transmission signal (transmission chirp signal) such as a chirp signal, for example. In particular, the signal generating unit 21 may generate a signal (linear chirp signal) whose frequency changes linearly and periodically. For example, the signal generating unit 21 may generate a chirp signal whose frequency linearly and periodically increases from 77 GHz to 81 GHz as time elapses. For example, the signal generating unit 21 may generate a signal whose frequency periodically repeats a linear increase (up-chirp) from 77 GHz to 81 GHz and a decrease (down-chirp) as time elapses. For example, the controller 10 may set in advance the signal generated by the signal generating unit 21. For example, the any storage unit (memory) or the like may store in advance the signal generated by the signal generating unit 21. Since a chirp signal used in a technical field such as the radar is known, more detailed description is appropriately simplified or omitted. The signal generated by the signal generating unit 21 is supplied to the synthesizer 22.

Figure 4:
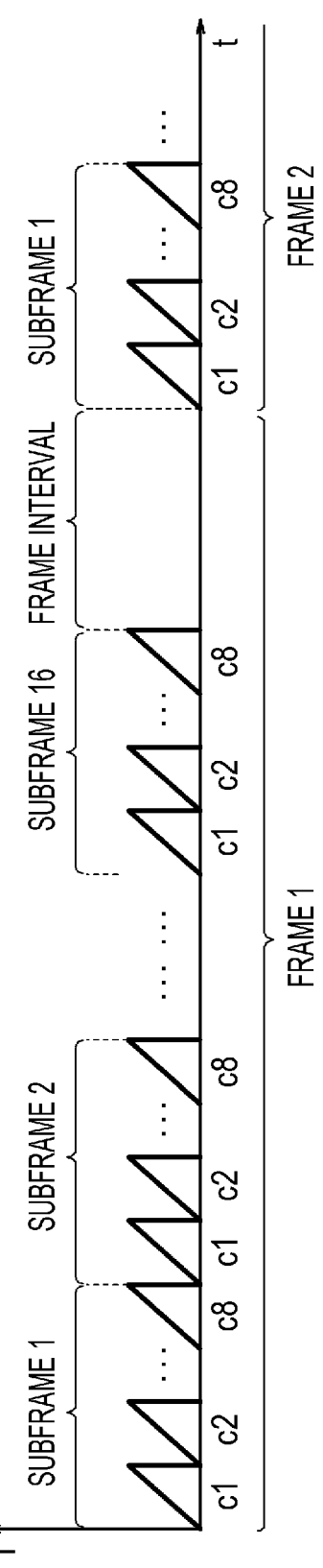
FIG. 4 is a diagram for describing a structure of a transmission signal according to the one embodiment.

FIG. 4 is a diagram for describing an example of chirp signals generated by the signal generating unit 21.

In FIG. 4, the horizontal axis represents elapsed time and the vertical axis represents a frequency. In the example illustrated in FIG. 4, the signal generating unit 21 generates linear chirp signals whose frequency changes linearly and periodically. FIG. 4 illustrates chirp signals c1, c2, . . . , c8. As illustrated in FIG. 4, the frequency of each chirp signal linearly increases as time elapses.

In the example illustrated in FIG. 4, one subframe includes eight chirp signals c1, c2, . . . , c8. That is, each of subframes such as a subframe 1 and a subframe 2 illustrated in FIG. 4 includes eight chirp signals c1, c2, . . . , c8. In the example illustrated in FIG. 4, one frame includes 16 subframes such as the subframes 1 to 16. That is, each of frames such as a frame 1 and a frame 2 illustrated in FIG. 4 includes 16 subframes. As illustrated in FIG. 4, a frame interval of a predetermined length may be included between frames. One frame illustrated in FIG. 4 may have a length of about 30 ms to 50 ms, for example.

In FIG. 4, the frame 2 and subsequent frames may have the same and/or similar configuration. In FIG. 4, the frame 3 and subsequent frames may have the same and/or similar configuration. In the electronic device 1 according to the one embodiment, the signal generating unit 21 may generate a transmission signal as any number of frames. In FIG. 4, an illustration of some chirp signals is omitted. As described above, for example, the any storage unit (memory) or the like may store a relationship between time and a frequency of the transmission signal generated by the signal generating unit 21.

As described above, the electronic device 1 according to the one embodiment may transmit a transmission signal made up of subframes each including multiple chirp signals. The electronic device 1 according to the one embodiment may transmit a transmission signal made up of frames each including a predetermined number of subframes.

In the description below, the electronic device 1 transmits a transmission signal having a frame structure illustrated in FIG. 4. However, the frame structure illustrated in FIG. 4 is an example. For example, the number of chirp signals included in one subframe is not limited to eight. In one embodiment, the signal generating unit 21 may generate a subframe including any number of (for example, multiple) chirp signals. The subframe structure illustrated in FIG. 4 is also an example. For example, the number of subframes included in one frame is not limited to 16. In one embodiment, the signal generating unit 21 may generate a frame including any number of (for example, multiple) subframes. The signal generating unit 21 may generate signals having different frequencies. The signal generating unit 21 may generate multiple discrete signals of bandwidths in which frequencies f are different from each other.

Referring back to FIG. 2, the synthesizer 22 increases the frequency of the signal generated by the signal generating unit 21 to a frequency in a predetermined frequency band. The synthesizer 22 may increase the frequency of the signal generated by the signal generating unit 21 to a frequency selected as a frequency of the transmission wave T to be transmitted from each of the transmission antennas 25. For example, the controller 10 may set the frequency selected as the frequency of the transmission wave T to be transmitted from each of the transmission antennas 25. For example, the any storage unit (memory) may store the frequency selected as the frequency of the transmission wave T to be transmitted from each of the transmission antennas 25. The signal whose frequency has been increased by the synthesizer 22 is supplied to the phase control unit 23 and the mixer 33. When the multiple phase control units 23 are present, the signal whose frequency has been increased by the synthesizer 22 may be supplied to each of the multiple phase control units 23. When the multiple reception units 30 are present, the signal whose frequency has been increased by the synthesizer 22 may be supplied to the mixer 33 of each of the multiple reception units 30.

Each of the phase control units 23 controls a phase of the transmission signal supplied from the synthesizer 22. Specifically, for example, in accordance with control performed by the controller 10, each of the phase control units 23 may appropriately advance or delay the phase of the signal supplied from the synthesizer 22 to adjust the phase of the transmission signal. In this case, based on a difference between paths of the transmission waves T to be transmitted from the multiple transmission antennas 25, the phase control units 23 may adjust the phases of the respective transmission signals. The phase control units 23 appropriately adjust the phases of the respective transmission signals, so that the transmission waves T transmitted from the multiple transmission antennas 25 enhance with each other in a predetermined direction to form a beam (beamforming). In this case, for example, the any storage unit (memory) may store a correlation between a direction of beamforming and amounts of phase by which the respective transmission signals transmitted by the multiple transmission antennas 25 are to be controlled. The transmission signal whose phase is controlled by each of the phase control units 23 is supplied to a respective one of the amplifiers 24.

The amplifier 24 amplifies power (electric power) of the transmission signal supplied from the phase control unit 23 in accordance with control performed by the controller 10, for example. When the sensor 5 includes the multiple transmission antennas 25, each of the multiple amplifiers 24 may amplify power (electric power) of the transmission signal supplied from a respective one of the phase control units 23 in accordance with control performed by the controller 10, for example. Since the technology for amplifying power of a transmission signal is already known, more detailed description is omitted. The amplifier 24 is connected to the transmission antenna 25.

The transmission antenna 25 outputs (transmits), as the transmission wave T, the transmission signal amplified by the amplifier 24. When the sensor 5 includes the multiple transmission antennas 25, each of the multiple transmission antennas 25 may output (transmit), as the transmission wave T, the transmission signal amplified by a respective one of the multiple amplifiers 24. Since the transmission antennas 25 can have a configuration that is the same as and/or similar to the configuration of transmission antennas for use in the known radar technology, more detailed description is omitted.

Accordingly, the electronic device 1 according to the one embodiment, which includes the transmission antennas 25, can transmit transmission signals (for example, transmission chirp signals) as the transmission waves T from the respective transmission antennas 25. At least one of the functional units of the electronic device 1 may be housed in one housing. In this case, the one housing may have a hard-to-open structure. For example, the transmission antennas 25, the reception antennas 31, and the amplifiers 24 are desirably housed in one housing, and this housing desirably has a hard-to-open structure. When the sensor 5 is installed on the mobility device 100 such as an automobile, each of the transmission antennas 25 may transmit the transmission wave T to outside the mobility device 100 through a cover member such as a radar cover, for example. In this case, the radar cover may be made of a material, for example, a synthetic resin or rubber, that allows an electromagnetic wave to pass therethrough. This radar cover may also serve as a housing of the sensor 5, for example. Covering the transmission antennas 25 with a member such as the radar cover can reduce a risk of the transmission antennas 25 being damaged or malfunctioning because of a contact with an external object. The radar cover and the housing may also be referred to as a radome.

FIG. 2 illustrates an example of the electronic device 1 that includes two transmission antennas 25. However, in one embodiment, the electronic device 1 may include any number of transmission antennas 25. On the other hand, in one embodiment, the electronic device 1 may include the multiple transmission antennas 25 when the transmission waves T transmitted from the respective transmission antennas 25 form a beam in a predetermined direction. In one embodiment, the electronic device 1 may include multiple transmission antennas 25. In this case, the electronic device 1 may include the multiple phase control units 23 and the multiple amplifiers 24 to correspond to the multiple transmission antennas 25. Each of the multiple phase control units 23 may control the phase of a respective one of the multiple transmission waves supplied from the synthesizer 22 and to be transmitted from the respective transmission antennas 25. Each of the multiple amplifiers 24 may amplify power of a respective one of the multiple transmission signals to be transmitted from the respective transmission antennas 25. In this case, the sensor 5 may include the multiple transmission antennas. As described above, when the electronic device 1 illustrated FIG. 2 includes the multiple transmission antennas 25, the electronic device 1 may include multiple functional units necessary for transmitting the transmission waves T from the multiple transmission antennas 25.

The reception antenna 31 receives the reflected wave R. The reflected wave R may be the transmission wave T reflected off the predetermined object 200. The reception antenna 31 may include multiple antennas such as the reception antennas 31A to 31D, for example. Since the reception antennas 31 can have a configuration that is the same as and/or similar to the configuration of reception antennas for use in the known radar technology, more detailed description is omitted. The reception antenna 31 is connected to the LNA 32. A reception signal based on the reflected wave R received by the reception antenna 31 is supplied to the LNA 32.

The electronic device 1 according to the one embodiment can receive, from each of the multiple reception antennas 31, the reflected wave R that is the transmission wave T that has been transmitted as the transmission signal (transmission chirp signal) such as a chirp signal, for example, and has been reflected off the predetermined object 200. When the transmission chirp signal is transmitted as the transmission wave T in this manner, the reception signal based on the received reflected wave R is referred to as a reception chirp signal. That is, the electronic device 1 receives the reception signal (for example, the reception chirp signal) as the reflected wave R from each of the reception antennas 31. When the sensor 5 is installed on the mobility device 100 such as an automobile, each of the reception antennas 31 may receive the reflected wave R from outside the mobility device 100 through a cover member such as a radar cover, for example. In this case, the radar cover may be made of a material, for example, a synthetic resin or rubber, that allows an electromagnetic wave to pass therethrough. This radar cover may also serve as a housing of the sensor 5, for example. Covering the reception antennas 31 with a member such as the radar cover can reduce a risk of the reception antennas 31 being damaged or malfunctioning because of a contact with an external object. The radar cover and the housing may also be referred to as a radome.

When the reception antenna 31 is installed near the transmission antenna 25, these reception antenna 31 and transmission antenna 25 may be collectively included in one sensor 5. That is, for example, one sensor 5 may include at least one transmission antenna 25 and at least one reception antenna 31. For example, one sensor 5 may include the multiple transmission antennas 25 and the multiple reception antennas 31. In such a case, one radar sensor may be covered with a cover member such as one radar cover, for example.

The LNA 32 amplifies, with low noise, the reception signal based on the reflected wave R received by the reception antenna 31. The LNA 32 may be a low-noise amplifier and amplifies, with low noise, the reception signal supplied from the reception antenna 31. The reception signal amplified by the LNA 32 is supplied to the mixer 33.

The mixer 33 mixes (multiplies) the reception signal having a radio frequency (RF) and supplied from the LNA 32 and the transmission signal supplied from the synthesizer 22 to generate a beat signal. The beat signal obtained by the mixer 33 through mixing is supplied to the IF unit 34.

The IF unit 34 performs frequency conversion on the beat signal supplied from the mixer 33 to decrease the frequency of the beat signal to an intermediate frequency (IF). The beat signal whose frequency has been decreased by the IF unit 34 is supplied to the AD conversion unit 35.

The AD conversion unit 35 digitizes the analog beat signal supplied from the IF unit 34. The AD conversion unit 35 may be configured as any analog-to-digital conversion circuit (Analog-to-Digital Converter (ADC)). The digitized beat signal obtained by the AD conversion unit 35 is supplied to the distance FFT processing unit 11 of the controller 10. When the multiple reception units 30 are present, the digitized beat signals obtained by the respective AD conversion units 35 may be supplied to the distance FFT processing unit 11 of the controller 10.

As illustrated in FIG. 3, the distance FFT processing unit 11 of the controller 10 estimates a distance between the mobility device 100 equipped with the electronic device 1 and the object 200, based on the beat signals supplied from the respective AD conversion units 35. The distance FFT processing unit 11 may include a processing unit that performs fast Fourier transform, for example. In this case, the distance FFT processing unit 11 may be configured as any circuit, any chip, or the like that performs fast Fourier transform (FFT).

The distance FFT processing unit 11 performs FFT processing (hereinafter, appropriately referred to as "distance FFT processing") on the digitized beat signals obtained by the AD conversion units 35. For example, the distance FFT processing unit 11 may perform FFT processing on complex signals supplied from the AD conversion units 35. The digitized beat signals obtained by the AD conversion units 35 can be represented as temporal changes in signal intensity (power). The distance FFT processing unit 11 performs FFT processing on such a beat signal, so that the beat signal can be represented as a signal intensity (power) for each frequency. If a peak in a result obtained by the distance FFT processing is equal to or greater than a predetermined threshold, the distance FFT processing unit 11 may determine that the predetermined object 200 is located at the distance corresponding to the peak. For example, in a known method such as constant false alarm rate (CFAR)-based detection processing, an object (reflecting object) that reflects a transmission wave is determined to be present if a peak value that is equal to or greater than a threshold is detected from the average power or amplitude of a disturbance signal. For example, the threshold determining unit 13 (described later) may determine whether an object is present based on such a threshold.

As described above, the electronic device 1 according to the one embodiment can detect, as the target, the object 200 that reflects the transmission wave T, based on the transmission signal transmitted as the transmission wave T and the reception signal received as the reflected wave R.

The distance FFT processing unit 11 can estimate a distance to the predetermined object, based on one chirp signal (for example, c1 illustrated in FIG. 4). That is, the electronic device 1 can measure (estimate) the distance A illustrated in FIG. 1 by performing the distance FFT processing. Since a technique for measuring (estimating) a distance to a predetermined object by performing FFT processing on a beat signal is known, more detailed description is appropriately simplified or omitted. The result (for example, distance information) of the distance FFT processing performed by the distance FFT processing unit 11 may be supplied to the velocity FFT processing unit 12. The result of the distance FFT processing performed by the distance FFT processing unit 11 may also be supplied to another functional unit such as the threshold determining unit 13, for example.

The velocity FFT processing unit 12 estimates a relative velocity between the mobility device 100 equipped with the electronic device 1 and the object 200, based on the beat signals on which the distance FFT processing has been performed by the distance FFT processing unit 11. The velocity FFT processing unit 12 may include a processing unit that performs fast Fourier transform, for example. In this case, the velocity FFT processing unit 12 may be configured as any circuit, any chip, or the like that performs fast Fourier transform (FFT).

The velocity FFT processing unit 12 further performs FFT processing (hereinafter, appropriately referred to as "velocity FFT processing") on the beat signals on which the distance FFT processing unit 11 has performed the distance FFT processing. For example, the velocity FFT processing unit 12 may perform FFT processing on the complex signals supplied from the distance FFT processing unit 11. The velocity FFT processing unit 12 can estimate a relative velocity of the predetermined object, based on a subframe (for example, the subframe 1 illustrated in FIG. 4) including chirp signals. Through the distance FFT processing performed on the beat signals in the above-described manner, multiple vectors can be generated. The velocity FFT processing unit 12 can estimate a relative velocity to the predetermined object by determining a phase of a peak in a result of the velocity FFT processing performed on these multiple vectors. That is, the electronic device 1 can measure (estimate) a relative velocity between the mobility device 100 and the predetermined object 200 illustrated in FIG. 1 by performing the velocity FFT processing. Since a technique for measuring (estimating) a relative velocity of a predetermined object by performing velocity FFT processing on a result of distance FFT processing is known, more detailed description is appropriately simplified or omitted. The result (for example, velocity information) of the velocity FFT processing performed by the velocity FFT processing unit 12 may be supplied to the threshold determining unit 13. The result of the velocity FFT processing performed by the velocity FFT processing unit 12 may also be supplied to another functional unit such as the angle-of-arrival estimating unit 14, for example.

The threshold determining unit 13 performs determination processing for a distance and/or a relative velocity, based on the result of the distance FFT processing performed by the distance FFT processing unit 11 and/or the result of the velocity FFT processing performed by the velocity FFT processing unit 12. The threshold determining unit 13 may perform the determination based on a predetermined threshold. For example, the threshold determining unit 13 may determine whether the result of the distance FFT processing performed by the distance FFT processing unit 11 and/or the result of the velocity FFT processing performed by the velocity FFT processing unit 12 exceeds a predetermined threshold. The threshold determining unit 13 may determine that an object has been detected at the distance and/or the relative velocity at which the result exceeds the predetermined threshold.

The threshold determining unit 13 may output results exceeding the predetermined threshold among the results of the distance FFT processing performed by the distance FFT processing unit 11 and/or the results of the velocity FFT processing performed by the velocity FFT processing unit 12. The operation performed by the threshold determining unit 13 may be same as and/or similar to, for example, detection processing based on a constant false alarm rate (CFAR). In one embodiment, the operation performed by the threshold determining unit 13 may be processing based on Order Statistic CFAR (OS-CFAR). OS-CFER is a technique in which a threshold is set based on ordered statistics and a target is determined to be present if the signal intensity exceeds the threshold. The result of the threshold-based determination processing performed by the threshold determining unit 13 may be supplied to the angle-of-arrival estimating unit 14. The result of the processing performed by the threshold determining unit 13 may be supplied to another functional unit such as the object detecting unit 15, for example.

The angle-of-arrival estimating unit 14 may estimate the direction from which the reflected wave R arrives from the predetermined object 200, based on the result of the velocity FFT processing performed by the velocity FFT processing unit 12 and/or the output from the threshold determining unit 13. The angle-of-arrival estimating unit 14 may estimate the direction from which the reflected wave R arrives from the predetermined object 200, based on the result output from the threshold determining unit 13 among the results of the velocity FFT processing performed by the velocity FFT processing unit 12. The electronic device 1 can estimate the direction from which the reflected wave R arrives, by receiving the reflected wave R from the multiple reception antennas 31. For example, the multiple reception antennas 31 are arranged at a predetermined interval. In this case, the transmission wave T transmitted from each of the transmission antennas 25 is reflected off the predetermined object 200 to become the reflected wave R. Each of the multiple reception antennas 31 arranged at the predetermined interval receives the reflected wave R. The angle-of-arrival estimating unit 14 can estimate the direction from which the reflected wave R arrives at each of the multiple reception antennas 31, based on the phase of the reflected wave R received by the reception antenna 31 and a difference in path of the reflected wave R. That is, the electronic device 1 can measure (estimate) the angle of arrival θ illustrated in FIG. 1, based on the result of the velocity FFT processing.

In the electronic device 1 according to the one embodiment, the angle-of-arrival estimating unit 14 may estimate a direction from which the reflected wave arrives, based on complex signals received by the multiple reception antennas 31 at the velocity at which the object is determined to be present. As described above, the electronic device 1 according to the one embodiment can estimate an angle of the direction in which the object is present.

Various techniques for estimating a direction from which the reflected wave R arrives, based on a result of velocity FFT processing have been proposed. For example, MUSIC (MUltiple SIgnal Classification), ESPRIT (Estimation of Signal Parameters via Rotational Invariance Technique), and the like are known direction-of-arrival estimation algorithms. Thus, more detailed description of the known techniques is appropriately simplified or omitted. Information (angle information) on the angle of arrival θ estimated by the angle-of-arrival estimating unit 14 may be supplied to the object detecting unit 15.

In the electronic device 1 according to the one embodiment, the object detecting unit 15 determines whether an object is detected as the target (for example, by clustering), based on information on the direction (angle) from which the reflected wave arrives, information on the relative velocity to the target, and/or information on the distance to the target. The information on the direction (angle) from which the reflected wave arrives may be acquired from the angle-of-arrival estimating unit 14. The information on the relative velocity and the distance to the target may be acquired from the threshold determining unit 13. The information on the relative velocity to the target may be acquired from the velocity FFT processing unit 12. The information on the distance to the target may be acquired from the distance FFT processing unit 11. The object detecting unit 15 may calculate average power at points constituting the object detected as the target.

The object detecting unit 15 detects an object located in a range to which the transmission wave T is transmitted, based on the information supplied from at least any of the distance FFT processing unit 11, the velocity FFT processing unit 12, the threshold determining unit 13, or the angle-of-arrival estimating unit 14. The object detecting unit 15 may perform detection of an object by performing, for example, clustering processing based on the supplied distance information, velocity information, and angle information. For example, DBSCAN (Density-based spatial clustering of applications with noise) or the like is a known algorithm used in clustering of data. In the clustering processing, for example, average power of points constituting the detected object may be calculated. The distance information, the velocity information, the angle information, and power information of the object detected by the object detecting unit 15 may be supplied to the tracking processing unit 16. The output from the object detecting unit 15 may be supplied to another functional unit such as the ECU 50, for example. In this case, when the mobility device 100 is an automobile, communication may be performed using a communication interface such as a CAN (Controller Area Network), for example.

The tracking processing unit 16 performs processing of predicting a target position, in the next frame, of the object subjected to the clustering processing performed by the object detecting unit 15. The tracking processing unit 16 may predict the position of the object, in the next frame, subjected to the clustering processing, by using a Kalman filter, for example. The tracking processing unit 16 may store the predicted position of the object in the next frame in the storage unit 17, for example.

The storage unit 17 can be implemented by, but not limited to, a semiconductor memory or a magnetic disk, for example, and may be implemented by any storage device. The storage unit 17 may be, for example, a storage medium such as a memory card inserted to the electronic device 1 according to the present embodiment. The storage unit 17 may be an internal memory of the CPU used as the controller 10 as described above. The storage unit 17 may store a program executed by the controller 10, results of processing performed by the controller 10, and so on. The storage unit 17 may function as a work memory of the controller 10. In one embodiment, the storage unit 17 may be the any storage unit (memory) described above.

In the one embodiment, the storage unit 17 may store various parameters for setting a range in which an object is detected based on the transmission wave T transmitted from each transmission antenna 25 and the reflected wave R received from each reception antenna 31.

In one embodiment, the tracking processing unit 16 may perform data association between a position predicted in the previous frame and a clustering position detected in the frame of interest. For example, the tracking processing unit 16 may provide a restriction on a minimum Euclidean distance, a minimum Mahalanobis distance, or a velocity. The tracking processing unit 16 may perform association between time frames in this manner.

In one embodiment, the tracking processing unit 16 may accumulate velocity information of a point cloud representing the same target in the storage unit 17, for example. Once the velocity information indicating the point cloud representing the same target is accumulated for a required number of point clouds and a required number of frames, the tracking processing unit 16 calculates a probability density distribution of the velocity. The storage unit 17 may store in advance a probability density distribution for reference (reference probability density distribution) of each target in advance. Hereinafter, the probability density distribution for reference of the target stored in a memory such as the storage unit 17, for example, is also referred to as a "reference probability density distribution" as appropriate.

The target classifying unit 18 classifies whether the object is a predetermined target, based on the information on the detected object. To this end, the target classifying unit 18 may calculate a probability density distribution, based on a velocity satisfying the required number of point clouds in the frame and the required number of frames. The target classifying unit 18 may classify the target, based on the reference probability density distribution stored in a memory such as the storage unit 17, for example, and the probability density distribution calculated from the velocity satisfying the required number of point clouds in the frame and the required number of frames. The target classifying unit 18 may calculate a Kullback-Leibler divergence from the calculated probability density distribution and each of the reference probability density distributions stored in the memory. The target classifying unit 18 may classify, as the predetermined target, a target for which the calculated Kullback-Leibler divergence is equal to or less than a predetermined threshold and has a smallest numerical value. Hereinafter, the Kullback-Leibler divergence is also referred to as a "KL divergence" as appropriate. The target classifying unit 18 may output a target classifying result (detection result) obtained in this manner to the ECU 50, for example.

The target classifying unit 18 may successively perform updating in subsequent frames satisfying the required number of point clouds and the required number of frames, and calculate the probability density distribution. For example, in the memory such as the storage unit 17, information on the old point clouds may be deleted.

For example, the ECU 50 included in the electronic device 1 according to the one embodiment is capable of controlling functional units of the mobility device 100 and controlling operations of the entire mobility device 100. To provide control and processing capabilities for executing various functions, the ECU 50 may include at least one processor, for example, a CPU (Central Processing Unit) or a DSP (Digital Signal Processor). The ECU 50 may be collectively implemented by one processor, may be implemented by some processors, or may be implemented by discrete individual processors. The processor may be implemented as one integrated circuit. The integrated circuit is also referred to as an IC. The processor may be implemented as multiple integrated circuits and discrete circuits connected to be able to perform communication. The processor may be implemented based on various other known technologies. In one embodiment, the ECU 50 may be configured as, for example, a CPU and a program executed by the CPU. The ECU 50 may appropriately include a memory necessary for operations of the ECU 50. At least part of the functions of the controller 10 may be functions of the ECU 50, or at least part of the functions of the ECU 50 may be functions of the controller 10.

The electronic device 1 illustrated in FIG. 2 includes the two transmission antennas 25 and the four reception antennas 31. However, the electronic device 1 according to the one embodiment may include any number of transmission antennas 25 and any number of reception antennas 31. For example, since the electronic device 1 includes the two transmission antennas 25 and the four reception antennas 31, the electronic device 1 can be considered to include a virtual antenna array virtually including eight antennas. As described above, the electronic device 1 may receive the reflected wave R of 16 subframes illustrated in FIG. 4 by using, for example, the eight virtual antennas.

Target classifying processing performed by the electronic device 1 according to the one embodiment is described.

As described above, the electronic device 1 according to the one embodiment transmits a transmission wave from the transmission antenna and receives, from the reception antenna, a reflected wave that is the transmission wave reflected off an object. The electronic device 1 according to the one embodiment may detect the object that reflects the transmission wave, based on the transmission signal and/or the reception signal. The electronic device 1 according to the one embodiment classifies whether the object detected in this manner is a predetermined target. The electronic device 1 according to the one embodiment classifies the object detected in the above-described manner as a target among the predetermined target candidates. An algorithm of such processing is further described below.

The electronic device 1 according to the one embodiment performs the target classifying processing, based on a Doppler velocity observed by the radar. The Doppler velocity observed by the radar of the electronic device 1 may be, for example, a relative velocity of an object detected by the electronic device 1 relative to the electronic device 1. With the electronic device 1, one Doppler velocity is observed for each object in one frame such as the frame 1 illustrated in FIG. 4, for example. Thus, the electronic device 1 may continuously acquire and analyze such a Doppler velocity over a predetermined time or longer. The electronic device 1 performs the target classifying processing based on such analysis.

The target to be classified by the electronic device 1 according to the one embodiment may be categorized into a class and a subclass. The class of the target may indicate the type of the target. For example, the class of the target may indicate the type of the target such as whether the target is an automobile, a two-wheeled vehicle, a bicycle, or a pedestrian. The subclass of the target may be a subcategory to which the target is classified in the class of the target and/or a subcategory to which the target is categorized in accordance with a motion state of the target. For example, the subclass of the target may be a subcategory of a pedestrian categorized in accordance with whether the pedestrian is an adult pedestrian, a child pedestrian, or an elderly pedestrian. The subclass of the target may be a subcategory such as a slowly walking pedestrian or a fast walking pedestrian to which the target is classified by the motion state of the pedestrian.

The electronic device 1 according to the one embodiment may calculate a probability density distribution (probability density function (PDF)) from the Doppler velocity continuously acquired in the above-described manner. For example, the electronic device 1 may organize a list $V_r$ of velocity distributions acquired for an 1-th (lowercase letter of the alphabet L) target into a frequency distribution table, perform normalization to make the total frequency equal to 1, and use this result as a probability density distribution $p_t^l$. Hereinafter, the probability density distribution thus obtained is also referred to as "probability density distribution based on observation" as appropriate. The electronic device 1 according to the one embodiment may calculate a reference probability density distribution $p_r^{i,k}$ in advance and store the reference probability density distribution $p_r^{i,k}$ in any memory such as the storage unit 17, for example. The reference probability density distribution $p_r^{i,k}$ may be stored in any location such as the electronic device 1, an external processor, or an external storage.

Figure 5:
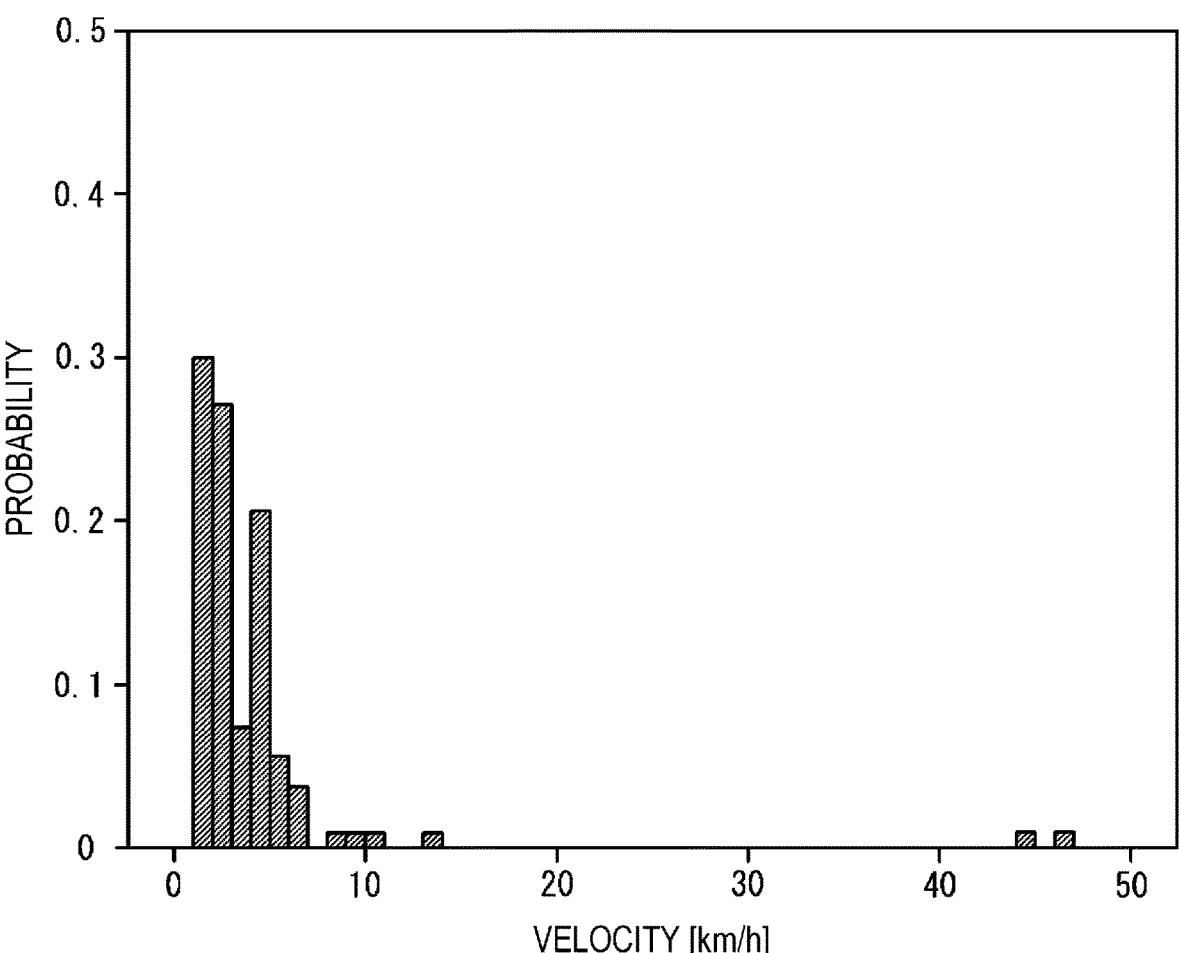
FIG. 5 is a diagram illustrating an example of a reference probability density distribution of a velocity of pedestrians.

FIG. 5 is a diagram illustrating an example of a reference probability density distribution for pedestrians. In FIG. 5, the horizontal axis represents a velocity, and the vertical axis represents a probability.

The electronic device 1 according to the one embodiment may calculate a distance between the probability density distribution $p_t^l$ and the reference probability density distribution $p_r^{i,k}$ (a difference between probability distributions). The distance between the probability density distributions (the difference between the probability distributions) may be calculated using a KL divergence $D_{KL}[k, i, l]$, for example. The distance between the probability density distributions (the difference between the probability distributions) may be calculated using a Pearson divergence, a relative Pearson divergence, or an $L^2$ distance, for example.

Figure 6:
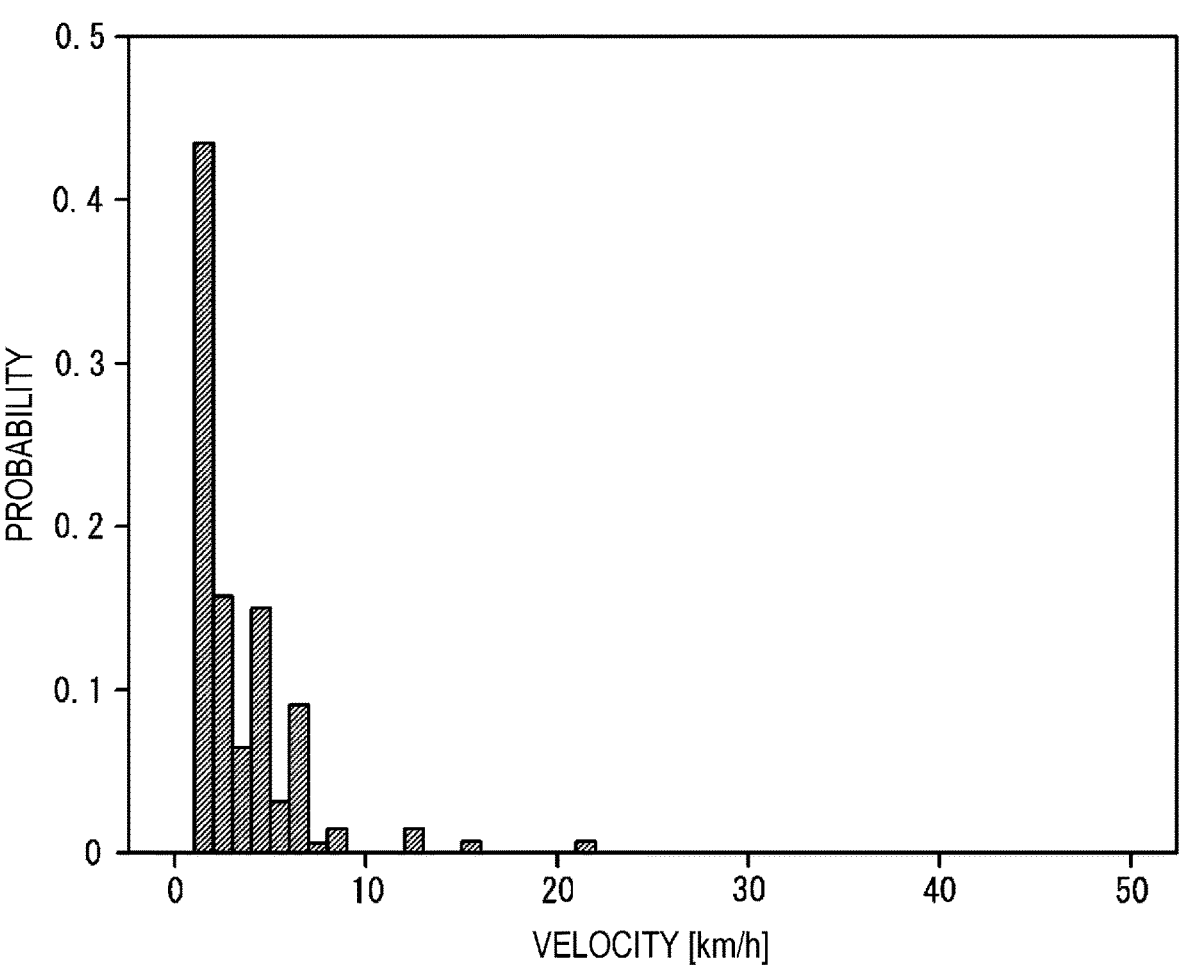
FIG. 6 is a diagram illustrating an example of a probability density distribution based on observation of a velocity of a pedestrian.

FIG. 6 is a diagram illustrating an example of a probability density distribution based on observation of a pedestrian. In FIG. 6, the horizontal axis represents a velocity, and the vertical axis represents a probability. The KL divergence $D_{KL}$ between the probability density distribution based on observation of a pedestrian illustrated in FIG. 6 and the reference probability density distribution for pedestrians illustrated in FIG. 5 is calculated to be 0.18.

Figure 7:
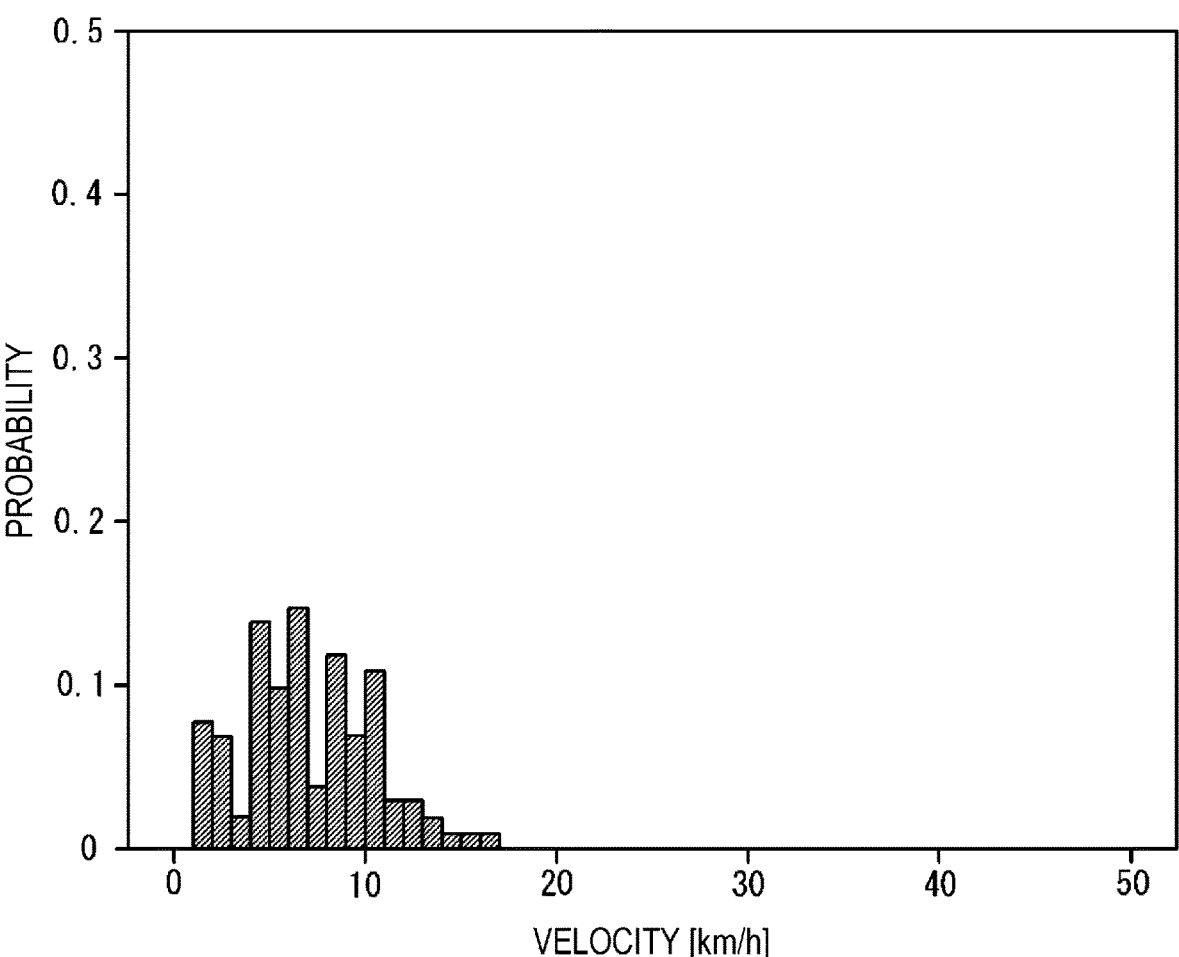
FIG. 7 is a diagram illustrating an example of a probability density distribution based on observation of a velocity of a bicycle.

FIG. 7 is a diagram illustrating an example of a probability density distribution based on observation of a bicycle. In FIG. 7, the horizontal axis represents a velocity, and the vertical axis represents a probability. The KL divergence $D_{KL}$ between the probability density distribution based on observation of a bicycle illustrated in FIG. 7 and the reference probability density distribution for pedestrians illustrated in FIG. 5 is calculated to be 0.82.

Figure 8:
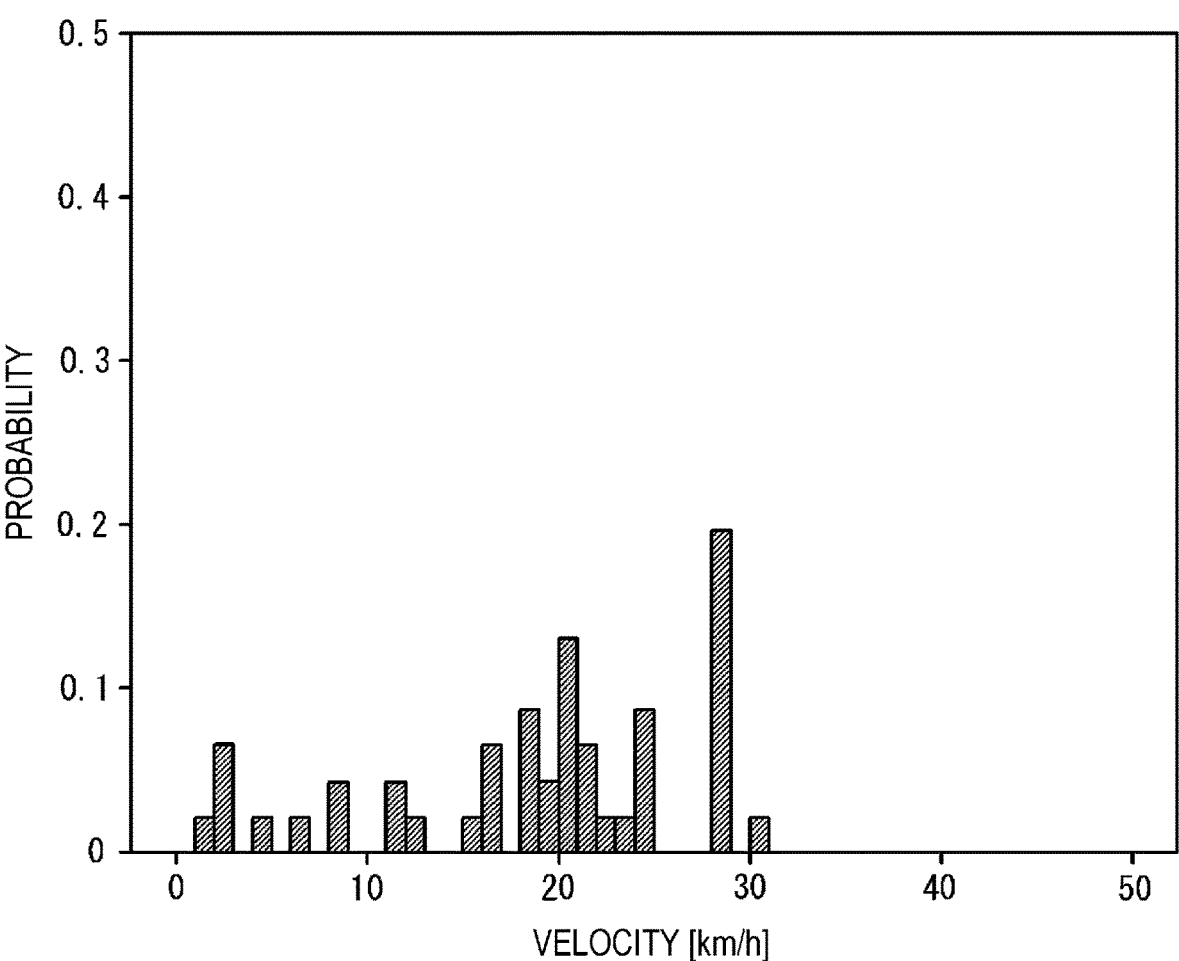
FIG. 8 is a diagram illustrating an example of a probability density distribution based on observation of an automobile.

FIG. 8 is a diagram illustrating an example of a probability density distribution based on observation of an automobile. In FIG. 8, the horizontal axis represents a velocity, and the vertical axis represents a probability. The KL divergence $D_{KL}$ between the probability density distribution based on observation of an automobile illustrated in FIG. 8 and the reference probability density distribution for pedestrians illustrated in FIG. 5 is calculated to be 2.24.

Once the electronic device 1 according to the one embodiment calculates the distances between the probability density distributions (the differences between the probability distributions) using, for example, the KL divergences $D_{KL}[k, i, l]$, the electronic device 1 compares the calculation results with a threshold $D_{KL,Th}$. As a result of this comparison, the electronic device 1 according to the one embodiment may output a class and a subclass for which the distance between the probability density distributions (the difference between the probability distributions) satisfying a condition of the threshold $D_{KL,Th}$ is the smallest.

For example, the electronic device 1 according to the one embodiment may consecutively evaluate the continuously acquired Doppler velocities of each object for a predetermined time, i.e., T seconds (for example, from about 1 second to about 5 seconds) to classify the target based on characteristics of the probability density distribution of the velocities. The electronic device 1 may successively update the probability density distributions of past frames for T seconds (T seconds/$\Delta$T seconds=N frames), for all moving objects (objects whose Doppler velocities are not 0). The electronic device 1 according to the one embodiment compares each object with the reference probability density distribution corresponding to each of the classes to one of which the target is desirably categorized. As a result of this comparison, the electronic device 1 according to the one embodiment assigns, to the target, the class and the subclass of the reference probability density distribution for which the KL divergence $D_{KL}$ is equal to or less than the predetermined threshold $D_{KL,Th}$ (for example, from about 0.1 to about 0.5) and for which the KL divergence is closest.

An algorithm of the target classifying processing performed by the electronic device 1 according to the one embodiment is further described. The algorithm of the target classifying processing performed by the electronic device 1 described below may be roughly performed in two steps, namely, step 1 and step 2. Each step is described below.

(Step 1)

In Step 1, the electronic device 1 may perform a process of acquiring (reading) the reference probability density distributions. In this case, the electronic device 1 may choose all the reference probability density distributions $p_r^{i,k}$ corresponding to the probability density distribution $p_t^l$ based on observation of the l-th (lowercase letter of the alphabet L) target.

The electronic device 1 may calculate distances each between the probability density distribution $p_t^l$ based on observation of the target and a respective one of the reference probability density distributions $p_r^{i,k}$ (differences between the probability distributions). The reference probability density distribution $p_r^{i,k}$ has two indices (superscripts) for the class k and the subclass i. For example, when the distance between the probability density distributions (the difference between the probability distributions) satisfies the predetermined condition, the electronic device 1 stores the indices k, i, and $D_{KL}[k, i, l]$ in the any memory such as the storage unit 17. The "predetermined condition" mentioned above may be, for example, that the KL divergence $D_{KL}$ is equal to or less than the predetermined threshold $D_{KL,Th}$. When the predetermined condition is satisfied, the indices k, i, and $D_{KL}$[k, i, 1] may be stored in a candidate list (see FIG. 11) of the object class stored in the any memory such as the storage unit 17. The candidate list of the object class is further described below.

The KL divergence $D_{KL}$ may be calculated based on Expression (1) below, for example.

[Math. 1]

$$D_{KL}[k, i, j] = \sum_{m=1}^{M} p_r^i \log \frac{p_r^{i,k}[m]}{p_t^j[m]} \quad (1)$$

In step 1, if a value i that is equal to or less than I and makes the KL divergence $D_{KL}$[k, i, 1] be equal to or less than the threshold $D_{KL,Th}$ is present, the electronic device 1 may store the indices k, i, and $D_{KL}$[k, i, 1] in the candidate list of the object class. Hereinafter, a condition that the value i that is equal to or less than I and makes the KL divergence $D_{KL}$[k, i, 1] be equal to or less than the threshold $D_{KL,Th}$ is present is referred to as a "first condition of class categorization" as appropriate.

That is, in step 1, the electronic device 1 calculates the KL divergence for the I reference probability density distributions of the k-th class. If the reference probability density distribution that makes the KL divergence be equal to or less than the predetermined threshold is present, the electronic device 1 stores the corresponding indices k, i, and $D_{KL}$[k, i, 1] in the candidate list of the object class.

In step 1, if no value i that makes the KL divergence be equal to or less than the predetermined threshold is present, that is, if the candidate list of the object class is an empty set, this target is not categorized into any object. In such a case, the electronic device 1 may display an indication indicating that the target is not categorized into any object on any display or the like, for example. For example, the electronic device 1 may indicate that the target is not categorized into any object by outputting an indication such as "no relevant object class" or "others" on the any display or the like. (Step 2)

In step 2, the electronic device 1 may select a set closest to the probability density distribution based on observation of the target from among the sets of the indices k, i, and $D_{KL}$[k, i, 1] recorded in the candidate list of the object class. In this case, the electronic device 1 may select a set that satisfies a condition that a value k that is equal to or less than K and satisfies Expression (2) below is present. Hereinafter, the condition that the value k that is equal to or less than K and satisfies Expression (2) is present is also referred to as a "second condition of class categorization" as appropriate.

[Math. 2]

$$\min_{k,i \in \Gamma} D_{KL}[k, i, j] \quad (2)$$

In Expression (2) above, F represents a set of k and i satisfying the first condition of class categorization described above.

In step 2, the electronic device 1 may assign the class and subclass selected in the above-described manner to the target.

That is, in step 2, the electronic device 1 selects a candidate having the smallest KL divergence for the probability density distribution p based on observation from the candidate list of the object class.

Figure 9:
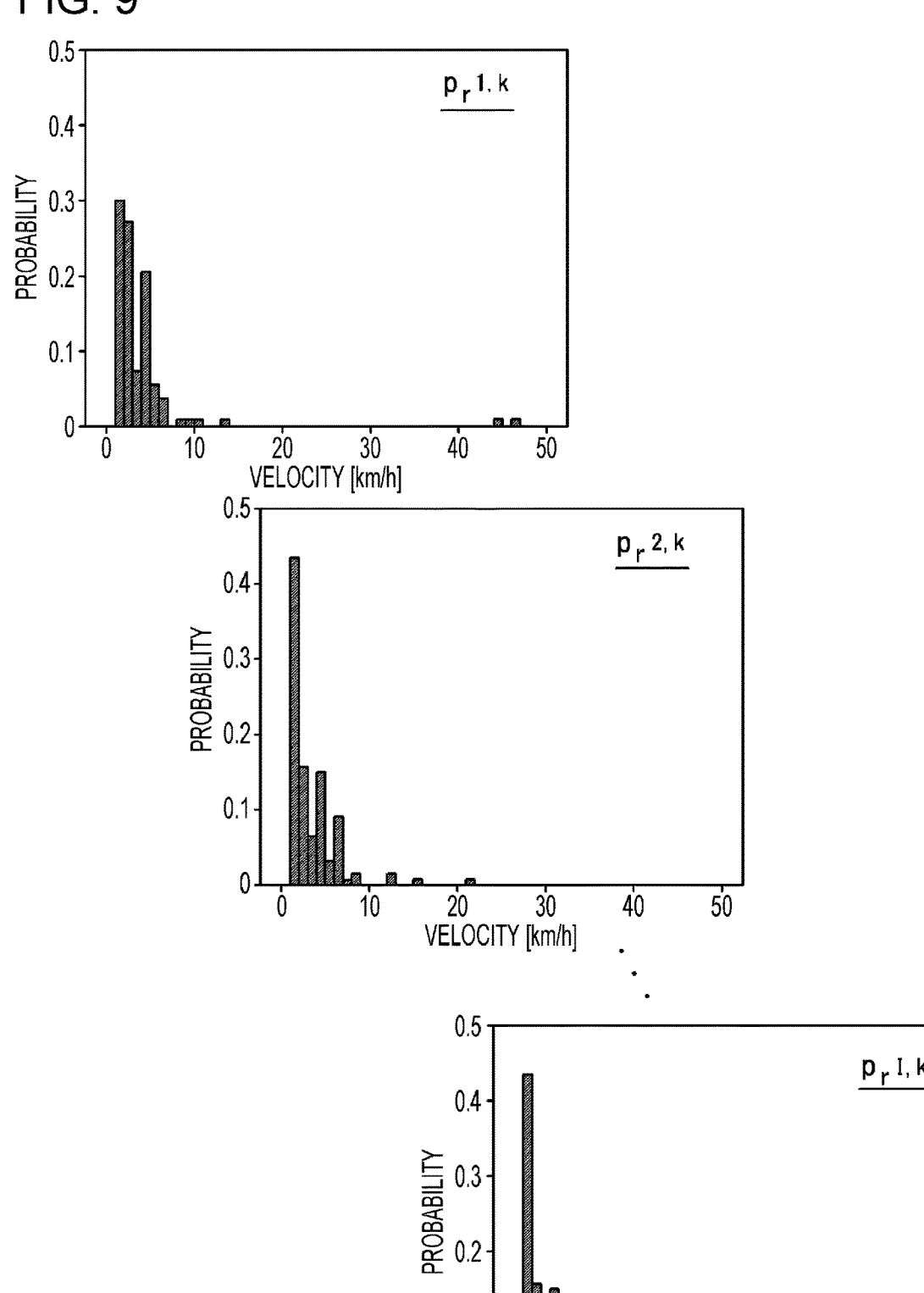
FIG. 9 is a diagram illustrating an example of reference probability density distributions of a k-th class.

FIG. 9 is a diagram illustrating an example of the reference probability density distributions of the k-th class. In each graph illustrated in FIG. 9, the horizontal axis represents a velocity, and the vertical axis represents a probability.

An upper graph illustrated in FIG. 9 indicates an example of the reference probability density distribution $p_r^{i,k}$ in the case of i=1, that is, the reference probability density distribution $p_r^{i,k}$. The superscript i indicates a subclass (subcategory/motion state of the target) in the k-th class (type of the target). The example illustrated in FIG. 9 indicates the cases where i is from 1 to I. A middle graph illustrated in FIG. 9 indicates an example of the reference probability density distribution $p_r^{i,k}$ in the case of i=2, that is, the reference probability density distribution $p_r^{2,k}$. A lower graph illustrated in FIG. 9 indicates an example of the reference probability density distribution $p_r^{i,k}$ in the case of i=I, that is, the reference probability density distribution $p_r^{1,k}$.

Figure 10:
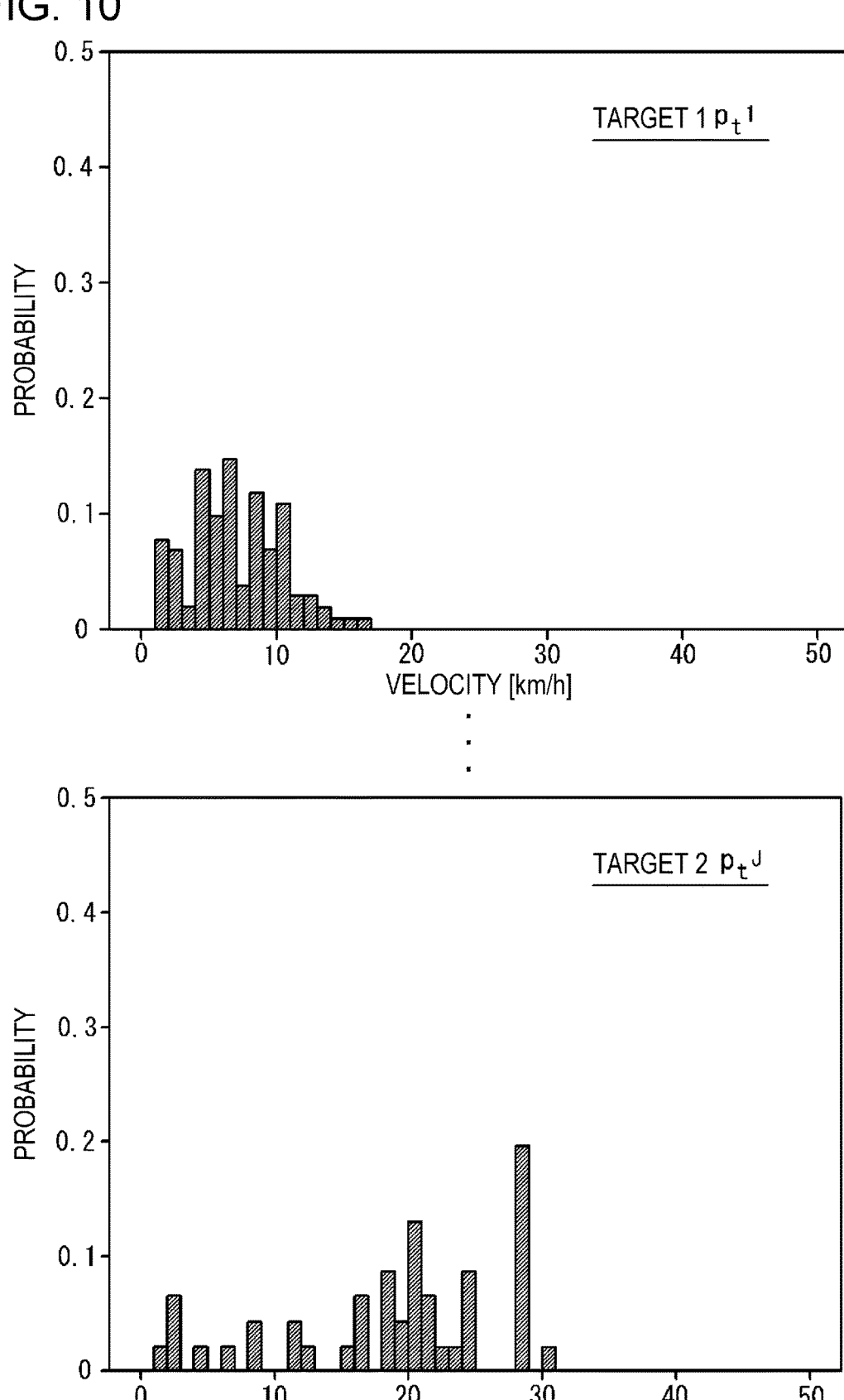
FIG. 10 is a diagram illustrating an example of probability density distributions of velocities of targets.

FIG. 10 is a diagram illustrating an example of a probability density distribution based on observation of each target. In each graph illustrated in FIG. 10, the horizontal axis represents a velocity, and the vertical axis represents a probability. An upper graph illustrated in FIG. 10 indicates an example of a probability density distribution $p_t^1$ based on observation of a target 1. A lower graph illustrated in FIG. 10 indicates an example of a probability density distribution $p_t^j$ based on observation of a target 2.

For example, the electronic device 1 according to the one embodiment calculates the KL divergences $D_{KL}$[i, k, j] from the probability density distribution based on observation of the target 1 illustrated in the upper part of FIG. 10 and the respective reference probability density distributions illustrated in FIG. 9. The electronic device 1 may classify the target by comparing the calculated KL divergences $D_{KL}$[i, k, j] with a predetermined threshold. Likewise, the electronic device 1 according to the one embodiment calculates the KL divergences $D_{KL}$[i, k, j] from the probability density distribution based on observation of the target 2 illustrated in the lower part of FIG. 10 and the respective reference probability density distributions illustrated in FIG. 9. The electronic device 1 may classify the target by comparing the calculated KL divergences $D_{KL}$[i, k, j] with a predetermined threshold.

FIG. 11 is a diagram illustrating an example of the candidate list of the object class.

As described above, when the distance between the probability density distributions (the difference between the probability distributions) satisfies a predetermined condition, the indices k, i, and $D_{KL}$[k, i, 1] are stored in any memory such as the storage unit 17. FIG. 11 is a diagram illustrating an example of the candidate list of the object class stored in the any memory such as the storage unit 17.

FIG. 11 illustrates a candidate list of the object class for a j-th target. As illustrated in FIG. 11, the candidate list of the object class may be a list of an object class, a subclass, and a KL divergence. The candidate list of the object class may be a list of the object class, the subclass, and the KL divergence that satisfy the "first condition of class categorization" described above, i.e., that are elements of the set F. The electronic device 1 may store, in the any memory such as the storage unit 17, a set that satisfies the "first condition of class categorization" described above and is recognized as elements of the set F among the sets of the indexes k, i, and $D_{KL}$[k, i, 1]. The processing related to the "second condition of class categorization" described above is performed based on the KL divergences stored in the candidate list of the object class illustrated in FIG. 11.

Figure 12:
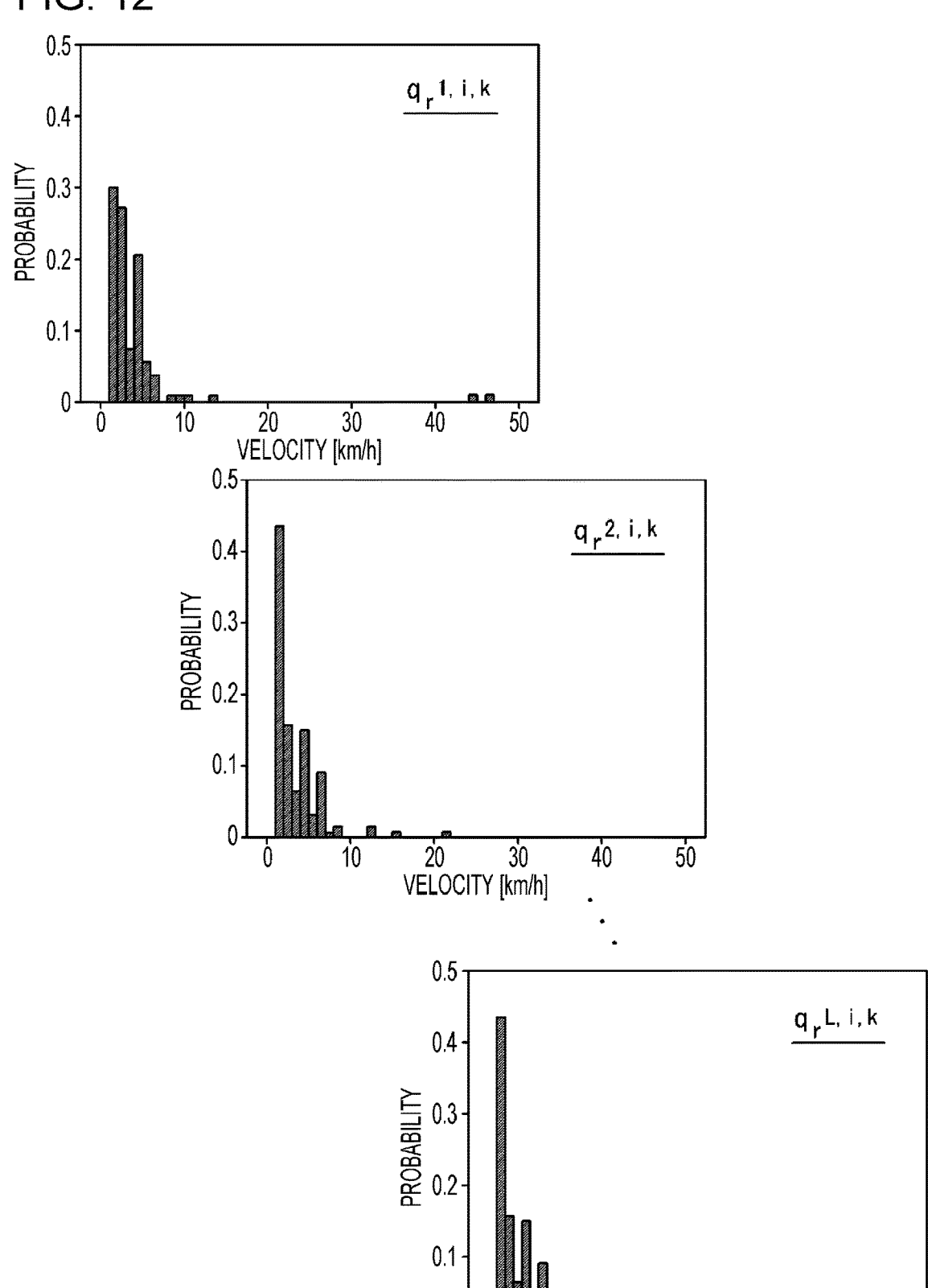
FIG. 12 is a diagram illustrating an example of probability density distributions of observation data serving as a basis of a reference probability density distribution for an i-th subclass in a k-th class.
Figure 13:
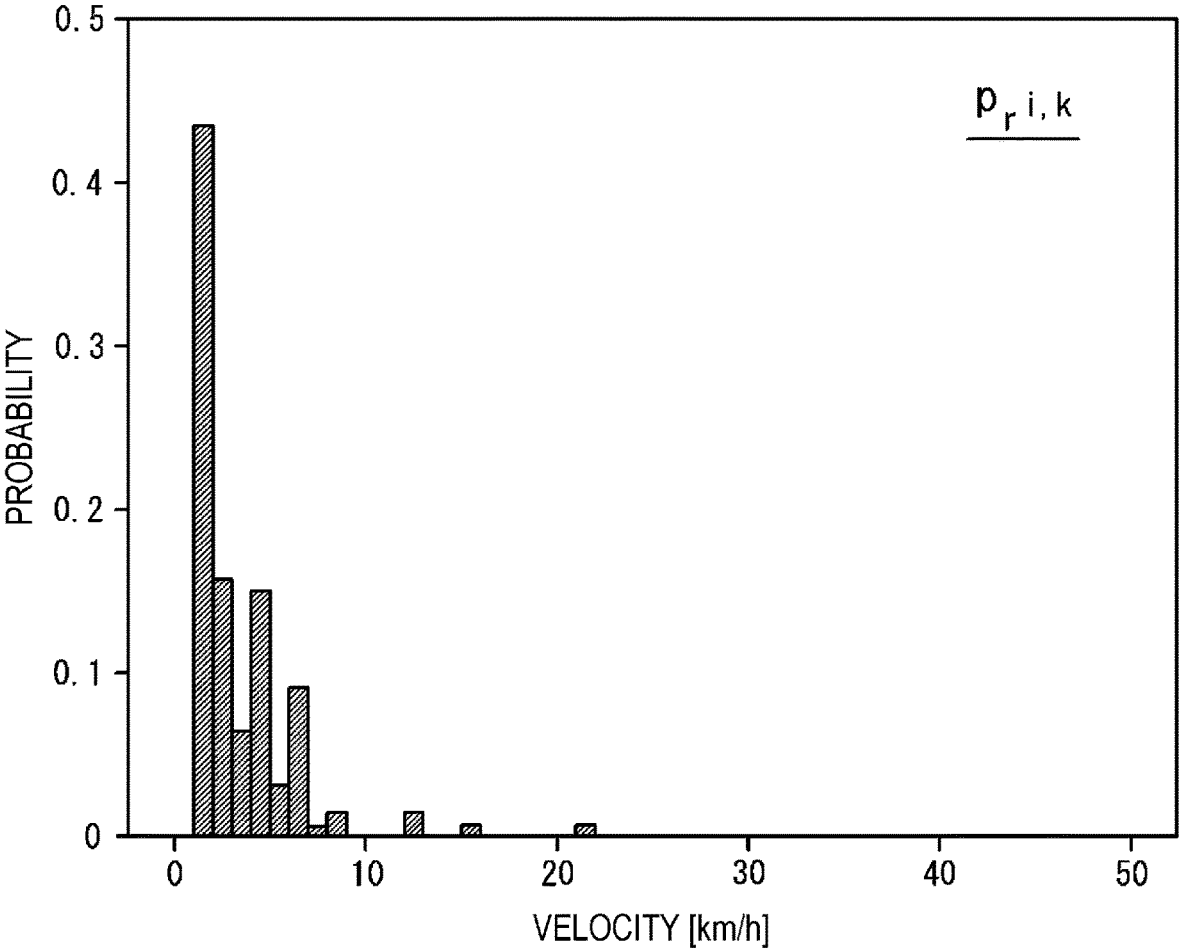
FIG. 13 is a diagram illustrating an example of a reference probability density distribution for the i-th subclass in the k-th class.

FIGS. 12 and 13 are diagrams for describing an algorithm of calculating a reference probability density distribution stored in advance in the any memory such as the storage unit 17.

The reference probability density distribution of each class may be created based on an algorithm below, for example. To calculate one reference probability density distribution $p_r^{i,k}$, the electronic device 1 according to the one embodiment may prepare probability density distributions $q_r^{l,i,k}$ based on L pieces of observation data. In this case, the electronic device 1 may calculate the probability density distribution $p_r^{i,k}$ such that the total sum of the KL divergences from these probability density distributions $q_r^{l,i,k}$ is the smallest.

The reference probability density distribution $p_r^{i,k}$ for an i-th subclass in the k-th class may be calculated based on, for example, Expression (3) below by using the probability density distributions $q_r^{l,i,k}$ (l=1, . . . , L) based on pieces of observation data serving as the basis of the reference probability density distribution $p_r^{i,k}$.

[Math. 3]

$$p_r^{i,k} = \sum_{l=1}^{L} \underset{p_r^{i,k}}{\mathrm{argmin}} \, D_{KL}[p_{r_i}^{i,k}, q_r^{l,i,k}] \qquad (3)$$

In this way, the electronic device 1 according to the one embodiment may calculate $p_r^{i,k}$ that makes the sum of the KL divergences smallest, for the probability density distributions $q_r^{l,i,k}$ (l=1, . . . , L) based on the pieces of observation data for creating the reference probability density distribution for the class k and the subclass i.

FIG. 12 is a diagram illustrating an example of the probability density distributions $q_r^{l,i,k}$. In each graph illustrated in FIG. 12, the horizontal axis represents a velocity, and the vertical axis represents a probability. An upper graph illustrated in FIG. 12 indicates an example of the probability density distribution $q_r^{l,i,k}$ in the case of l=1, that is, the probability density distribution $q_r^{l,i,k}$. A middle graph illustrated in FIG. 12 indicates an example of the probability density distribution $q_r^{l,i,k}$ in the case of l=2, that is, the probability density distribution $q_r^{2,i,k}$. A lower graph illustrated in FIG. 12 indicates an example of the probability density distribution $q_r^{l,i,k}$ in the case of l=L, that is, the probability density distribution $q_r^{l,i,k}$.

FIG. 13 is a diagram illustrating an example of the reference probability density distribution $p_r^{i,k}$ calculated based on the probability density distributions $q_r^{l,i,k}$ (l=1, . . . , L) illustrated in FIG. 12. In the graph illustrated in FIG. 13, the horizontal axis represents a velocity, and the vertical axis represents a probability.

A procedure of the target classifying processing performed by the electronic device 1 according to the one embodiment is described.

Figure 14:
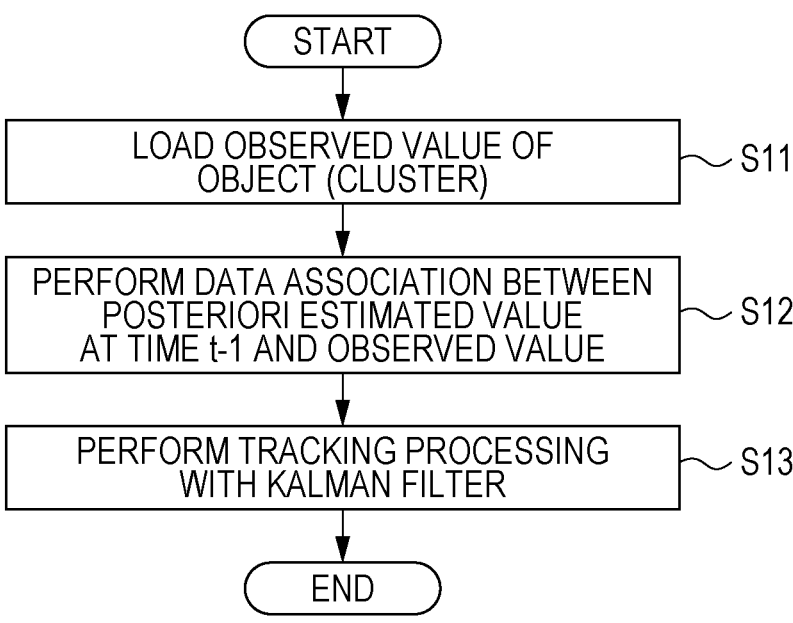
FIG. 14 is a flowchart for describing an operation of the electronic device according to the one embodiment.
Figure 15:
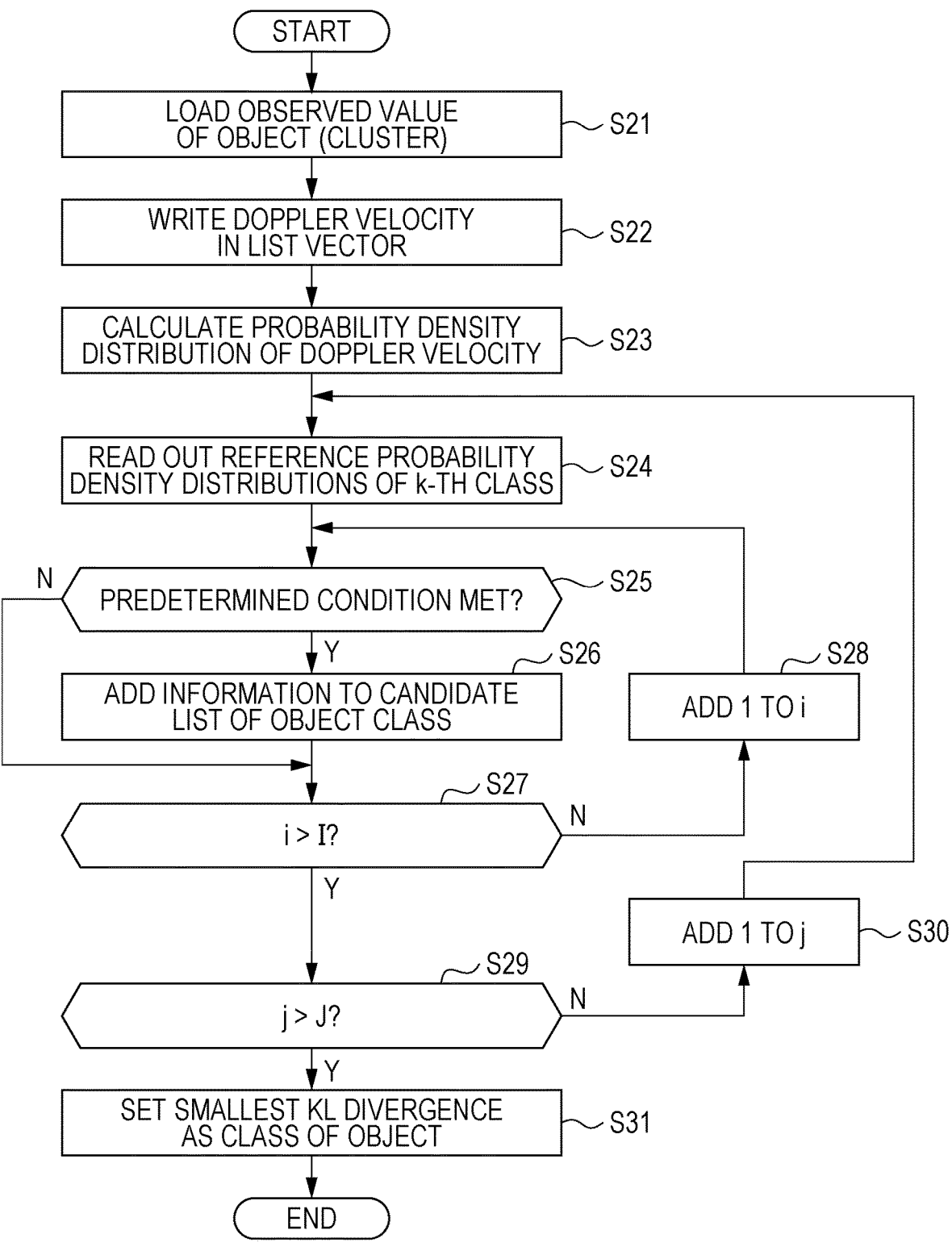
FIG. 15 is a flowchart for describing an operation of the electronic device according to the one embodiment.

FIGS. 14 and 15 are flowcharts illustrating an example of a procedure in which the electronic device performs the algorithm of the target classifying processing described above. FIGS. 14 and 15 illustrate a process performed at time t by the electronic device 1 according to the one embodiment. The electronic device 1 according to the one embodiment may perform the target classifying processing together with target tracking processing. That is, the target classifying processing performed by the electronic device 1 according to the one embodiment may be a combination of the processes illustrated in FIGS. 14 and 15.

The process illustrated in FIG. 14 is related to tracking of a target. The process illustrated in FIG. 14 may be performed by data association and Bayesian inference using a Kalman filter or the like.

In response to the start of the process illustrated in FIG. 14, the controller 10 loads an observed value of an object (cluster) (step S11). In step S11, the controller 10 can acquire the position of the target and the velocity (relative velocity) of the target calculated from the position.

The controller 10 performs data association between a posteriori estimated value at previous time (time t−1) and the observed value (step S12). In data association in step S12, an observed value, acquired at time t, of the position of the object and the velocity calculated from the position may be compared with the posteriori estimated value calculated with a Bayesian inference processing method using a Kalman filter or the like at the previous time t−1.

The controller 10 performs tracking processing using a Kalman filter, for example (step S13). In step S13, the controller 10 may perform processing of calculating the predicted value (priori estimated value) and processing of calculating the posteriori estimated value. In the processing of calculating the predicted value (priori estimated value), the controller 10 may derive the predicted value (priori estimated value) at the current time t from the posteriori estimated value at the previous time t−1. In the processing of calculating the posteriori estimated value, the controller 10 may calculate the posteriori estimated value by Bayesian inference with the observed value, acquired at the current time t, subjected to data association with the predicted value (priori estimated value) at the current time t.

The Doppler velocity obtained as the observed value by the radar is a Doppler velocity in a normal direction of the reception antenna 31. That is, the electronic device 1 is unable to observe the velocity in the direction parallel to the reception antenna 31 in principle. Therefore, the Doppler velocity obtained as the observed value by the radar is different from the velocity calculated based on the position. In general, the velocity in the normal direction of the radar can be calculated based on the velocity calculated from the position. However, the velocity in the normal direction of the radar, which is calculated based on the velocity calculated from the position, tends to include many observation errors and the like. Thus, the velocity in the normal direction of the radar thus calculated may be different from the Doppler velocity because of the influence of the observation errors or the like. Accordingly, the electronic device 1 according to the one embodiment may use a Doppler velocity with an increased accuracy. However, the electronic device 1 according to the one embodiment may use the velocity calculated from the position and having an accuracy increased by various kinds of processing.

The process illustrated in FIG. 15 is a flowchart for describing the target classifying processing performed by the electronic device 1 according to the one embodiment.

As illustrated in FIG. 15, the target classifying processing performed by the electronic device 1 according to the one embodiment may include double-looped processing for the class k and the subclass i.

In response to the start of the process illustrated in FIG. 15, the controller 10 loads an observed value of an object (cluster) (step S21). The processing of step S21 may be performed in the same or similar manner as or to the processing of step S11 described above. In step S21, the controller 10 can acquire information on the Doppler velocity of the target.

The controller 10 writes the Doppler velocity in a list vector $V_r$ in which Doppler velocities are listed (step S22).

The controller 10 calculates the probability density distribution p of the Doppler velocity (step S23).

The controller 10 reads out the reference probability density distributions $p_r^{i,k}$ of the k-th class from the any memory such as the storage unit 17 (step S24). In step S24, the controller 10 may read out the reference probability density distributions $p_r^{i,k}$ of the k-th class.

The controller 10 determines whether the probability density distribution $p_r^{i,k}$ of the object and the reference probability density distribution $p_r^i$ satisfy a predetermined condition (step S25). The predetermined condition in step S25 may be the "first condition of class categorization" described above.

On the other hand, if the predetermined condition is not satisfied in step s25, the controller 10 may skip processing of step S26.

The controller 10 determines the number of loops (step S27). In step S27, the controller 10 may determine whether i is greater than I. If i is not greater than I in step S27, the controller 10 may add 1 to i (step S28), and the process may return to step S25. On the other hand, if i is greater than I in step S27, the controller 10 performs processing of step S29.

In step S29, the controller 10 determines the number of loops (step S29). In step S29, the controller 10 may determine whether j is greater than J. If j is not greater than J in step S29, the controller 10 may add 1 to j (step S30) and the process may return to step S24. On the other hand, if j is greater than J in step S29, the controller 10 performs processing of step S31.

In step S31, the controller 10 may set a class with the smallest KL divergence as the class of the object, and end the process illustrated in FIG. 15. In step S31, the controller 10 may find the smallest KL divergence from among the KL divergences $D_{KL,i}$, and set the corresponding class as the class of the object. In this case, the controller 10 may select one that satisfies the "second condition of class categorization" described above.

As described above, in the electronic device 1 according to the one embodiment, the controller 10 may classify a predetermined target, based on a probability density distribution calculated from a relative velocity of an object relative to the electronic device 1. The controller 10 may determine whether the object is the predetermined target, based on the probability density distribution calculated from the relative velocity of the object relative to the electronic device 1. The controller 10 may determine whether the object is the predetermined target, through comparison of the probability density distribution calculated from the relative velocity of the object relative to the electronic device 1 with the reference probability density distribution stored in advance in the storage unit 17. The controller 10 may determine whether the object is the predetermined target, through comparison of distances between the probability density distribution calculated from the relative velocity of the object relative to the electronic device 1 and the reference probability density distributions. The controller 10 may determine that the object is the predetermined target when a Kullback-Leibler divergence between the probability density distribution calculated from the relative velocity of the object relative to the electronic device 1 and the reference probability density distribution is equal to or less than a predetermined threshold. The controller 10 may determine that the object is the predetermined target when a numerical value of the Kullback-Leibler divergence between the probability density distribution calculated from the relative velocity of the object relative to the electronic device 1 and the reference probability density distribution is smallest. The controller 10 may classify the predetermined target, based on the probability density distribution calculated from a Doppler velocity of the object.

If machine learning is performed using sets of a distance direction, a horizontal direction, and a velocity as pieces of teaching data, the number of pieces of teaching data tends to be vast. Thus, a processing load and/or a necessary memory increase. Consequently, implementation by a millimeter-wave radar alone is expected to be difficult. However, the electronic device 1 according to the one embodiment can calculate the probability density distribution of the velocity information of the target, and thus classify the target with a small number of patterns of the reference data of the target. Thus, the electronic device 1 according to the one embodiment can reduce the processing load and/or the necessary memory. The electronic device 1 according to the one embodiment can classify the target with a high accuracy.

While the present disclosure has been described based on the various drawings and the embodiments, it is to be noted that a person skilled in the art can easily make various variations or corrections based on the present disclosure. Therefore, it is to be noted that these variations or corrections are within the scope of the present disclosure. For example, functions and the like included in each functional unit can be rearranged without causing any logical contradiction. Multiple functional units or the like may be combined into one or may be divided. The embodiments according to the present disclosure described above are not limited to strict implementation according to the respective embodiments described above, and may be implemented by appropriately combining the features or omitting part thereof. That is, a person skilled in the art can make various variations and corrections to the contents of the present disclosure based on the present disclosure. Therefore, these variations and corrections are within the scope of the present disclosure. For example, in each embodiment, each functional unit, each means, each step, or the like can be added to another embodiment or replaced with each functional unit, each means, each step, or the like in another embodiment without causing any logical contradiction. In each embodiment, multiple functional units, means, steps, or the like may be combined into one or may be divided. The embodiments of the present disclosure described above are not limited to strict implementation according to the respective embodiments described above, and may be implemented by appropriately combining the features or omitting part thereof.

For example, in the embodiments described above, the description has been given of the configuration in which the object detection ranges are dynamically switched between by using the one sensor 5. However, in one embodiment, detection of an object may be performed in the determined object detection ranges by using the multiple sensors 5. In one embodiment, beamforming may be performed toward the determined object detection ranges by using the multiple sensors 5.

The embodiments described above are not limited to implementation as the electronic device 1. For example, the embodiments described above may be implemented as a method for controlling a device such as the electronic device 1. For example, the embodiments described above may be implemented as a program executed by a device such as the electronic device 1, a computer, or the like.

The electronic device 1 according to one embodiment may include, as the minimum configuration, at least part of at least one of the sensor 5 or the controller 10, for example. On the other hand, the electronic device 1 according to one embodiment may appropriately include at least any of the signal generating unit 21, the synthesizer 22, the phase control units 23, the amplifiers 24, or the transmission antennas 25 illustrated in FIG. 2 in addition to the controller 10. The electronic device 1 according to the one embodiment may appropriately include at least any of the reception antenna 31, the LNA 32, the mixer 33, the IF unit 34, or the AD conversion unit 35 instead of or along with the functional units described above. The electronic device 1 according to the one embodiment may include any storage unit (memory). As described above, the electronic device 1 according to the one embodiment can employ various configurations. When the electronic device 1 according to the one embodiment is mounted in the mobility device 100, for example, at least any of the functional units described above may be installed at an appropriate place such as the inside of the mobility device 100. On the other hand, in one embodiment, for example, at least any of the transmission antennas 25 and the reception antennas 31 may be installed outside the mobility device 100.

REFERENCE SIGNS 1 electronic device
5 sensor
10 controller
11 distance FFT processing unit
12 velocity FFT processing unit
13 threshold determining unit
14 angle-of-arrival estimating unit
15 object detecting unit
16 tracking processing unit
17 storage unit
18 target classifying unit
20 transmission unit
21 signal generating unit
22 synthesizer
23 phase control unit
24 amplifier
25 transmission antenna
30 reception unit
31 reception antenna
32 LNA
33 mixer
34 IF unit
35 AD conversion unit
50 ECU
100 mobility device
200 object

The invention claimed is:

1. An electronic device comprising:
a transmission antenna configured to transmit a transmission wave;
a reception antenna configured to receive a reflected wave that is the transmission wave having been reflected; and
a controller configured to detect an object that reflects the transmission wave, based on a transmission signal transmitted as the transmission wave and a reception signal received as the reflected wave and classify the object as a type of object from among a plurality of types of objects, based on a probability density function of a velocity of the object over a period of time calculated from a relative velocity of the object relative to the electronic device,
wherein the plurality of types of objects includes an automobile, a bicycle, and a pedestrian, and
the type of object is one of the automobile, the bicycle, and the pedestrian.

2. The electronic device according to claim 1, wherein the controller is configured to determine whether the object is the type of object, based on the probability density function of the velocity of the object over the period of time calculated from the relative velocity of the object relative to the electronic device.

3. The electronic device according to claim 1, wherein the controller is configured to determine whether the object is the type of object, through comparison of the probability density function of the velocity of the object over the period of time calculated from the relative velocity of the object relative to the electronic device with a reference probability density function stored in the electronic device.

4. The electronic device according to claim 3, wherein the controller is configured to determine whether the object is the type of object, through comparison of distances each between the probability density function of the velocity of the object over the period of time calculated from the relative velocity of the object relative to the electronic device and a respective one of reference probability density functions.

5. The electronic device according to claim 4, wherein the controller is configured to determine that the object is the type of object when a Kullback-Leibler divergence between the probability density function of the velocity of the object over the period of time calculated from the relative velocity of the object relative to the electronic device and a reference probability density function among the reference probability density functions is equal to or less than a predetermined threshold.

6. The electronic device according to claim 5, wherein the controller is configured to determine that the object is the type of object when a numerical value of the Kullback-Leibler divergence is smallest.

7. The electronic device according to claim 1, wherein the controller is configured to classify the object as the type of object, based on the probability density function of the velocity of the object over the period of time calculated from a Doppler velocity of the object.

8. A method for controlling an electronic device, comprising:
transmitting a transmission wave from a transmission antenna;
receiving, from a reception antenna, a reflected wave that is the transmission wave having been reflected;
detecting an object that reflects the transmission wave, based on a transmission signal transmitted as the transmission wave and a reception signal received as the reflected wave; and
classifying the object as a type of object from among a plurality of types of objects, based on a probability density function of a velocity of the object over a period of time calculated from a relative velocity of the object relative to the electronic device,
wherein the plurality of types of objects includes an automobile, a bicycle, and a pedestrian, and
the type of object is one of the automobile, the bicycle, and the pedestrian.

9. A non-transitory computer-readable recording medium storing computer program instructions, which when executed by an electronic device, cause the electronic device to:

transmit a transmission wave from a transmission antenna;

receive, from a reception antenna, a reflected wave that is the transmission wave having been reflected;

detect an object that reflects the transmission wave, based on a transmission signal transmitted as the transmission wave and a reception signal received as the reflected wave; and classify the object as a type of object from among a plurality of types of objects, based on a probability density function of a velocity of the object over a period of time calculated from a relative velocity of the object relative to the electronic device, wherein the plurality of types of objects includes an automobile, a bicycle, and a pedestrian, and the type of object is one of the automobile, the bicycle, and the pedestrian.

\*     \*     \*     \*     \*